United States Patent
Uno et al.

[11] Patent Number: 5,868,451
[45] Date of Patent: Feb. 9, 1999

[54] STORAGE STRUCTURE FOR MOTOR VEHICLE SEAT

[75] Inventors: Koji Uno; Koji Kamida; Kunimichi Odagaki, all of Wako, Japan

[73] Assignee: Honda Giken Kogyo Kabushiki Kaisha, Tokyo, Japan

[21] Appl. No.: 766,127

[22] Filed: Dec. 16, 1996

[30] Foreign Application Priority Data

Jan. 30, 1996 [JP] Japan .................................... 8-014646
Oct. 17, 1996 [JP] Japan .................................... 8-274817

[51] Int. Cl.$^6$ ...................................................... B60N 3/04
[52] U.S. Cl. ..................... 296/66; 296/65.05; 296/65.13; 297/15
[58] Field of Search ............................ 296/66, 63, 65.01, 296/65.05, 65.09, 65.13; 297/15

[56] References Cited

U.S. PATENT DOCUMENTS

| | | |
|---|---|---|
| 5,106,144 | 4/1992 | Hayakawa et al. ............... 296/65.05 X |
| 5,195,795 | 3/1993 | Cannera et al. ....................... 296/66 X |
| 5,269,581 | 12/1993 | Odagaki et al. ........................... 296/66 |
| 5,492,386 | 2/1996 | Callum ............................. 296/65.13 X |

FOREIGN PATENT DOCUMENTS 5-40029  5/1993  Japan .

Primary Examiner—Joseph D. Pape
Attorney, Agent, or Firm—Carrier, Blackman & Associates, P.C.; Joseph P. Carrier; William D. Blackman

[57] ABSTRACT

A storage structure stores a motor vehicle seat which has a seat cushion and a seatback foldable against the seat cushion and movable in a longitudinal direction of a motor vehicle. The storage structure has a fixed rail fixed to the motor vehicle, a movable rail movable along the fixed rail for longitudinal positioning adjustment of the seat, a holding mechanism disposed on a longitudinal end of the movable rail and the seat cushion, for fixing the seat cushion to the movable rail, and a pivot hinge disposed between an opposite longitudinal end of the movable rail and an engaging portion of the fixed rail, for allowing the seat cushion to swing thereabout with the seat cushion being released by the holding mechanism.

20 Claims, 24 Drawing Sheets

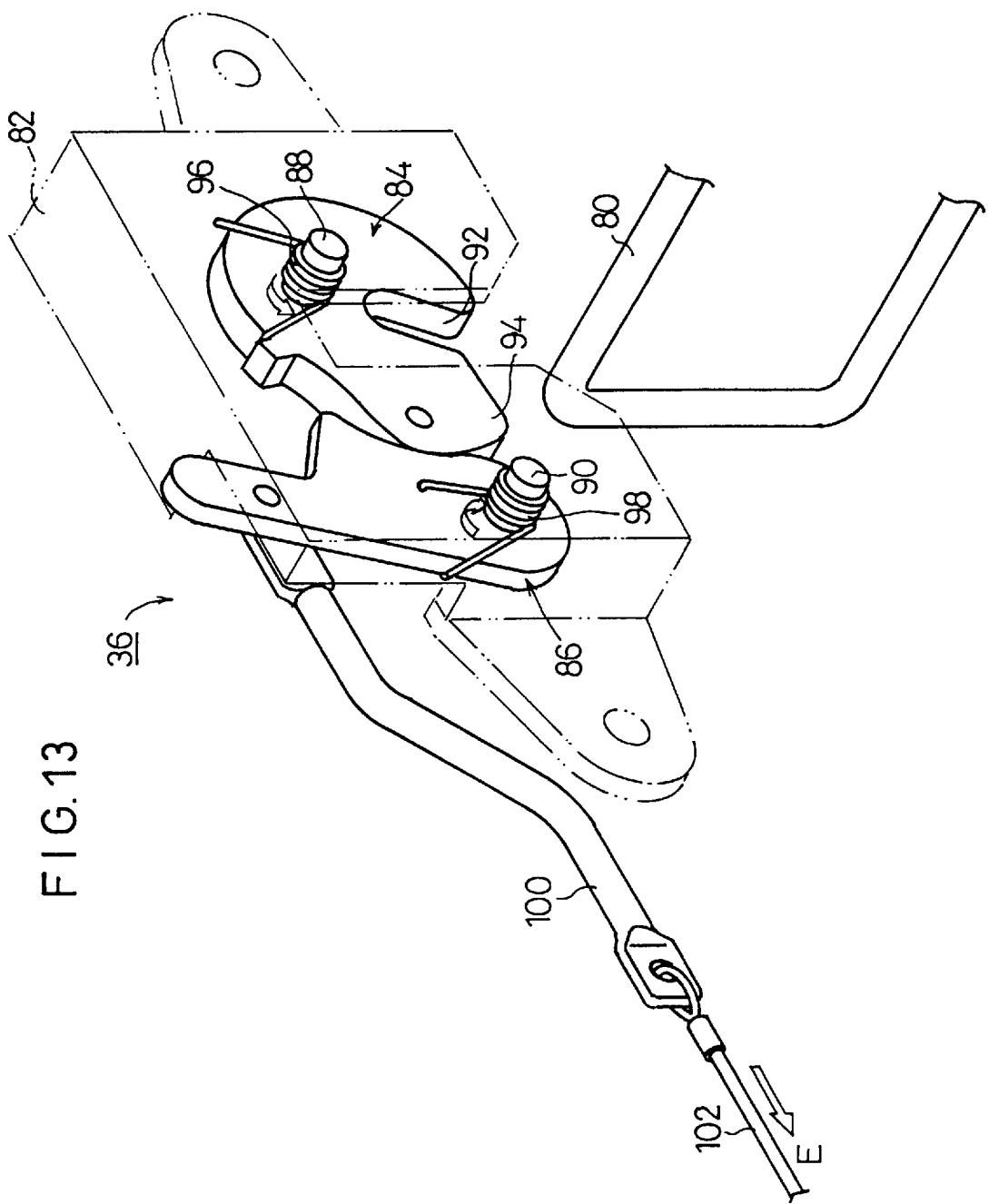

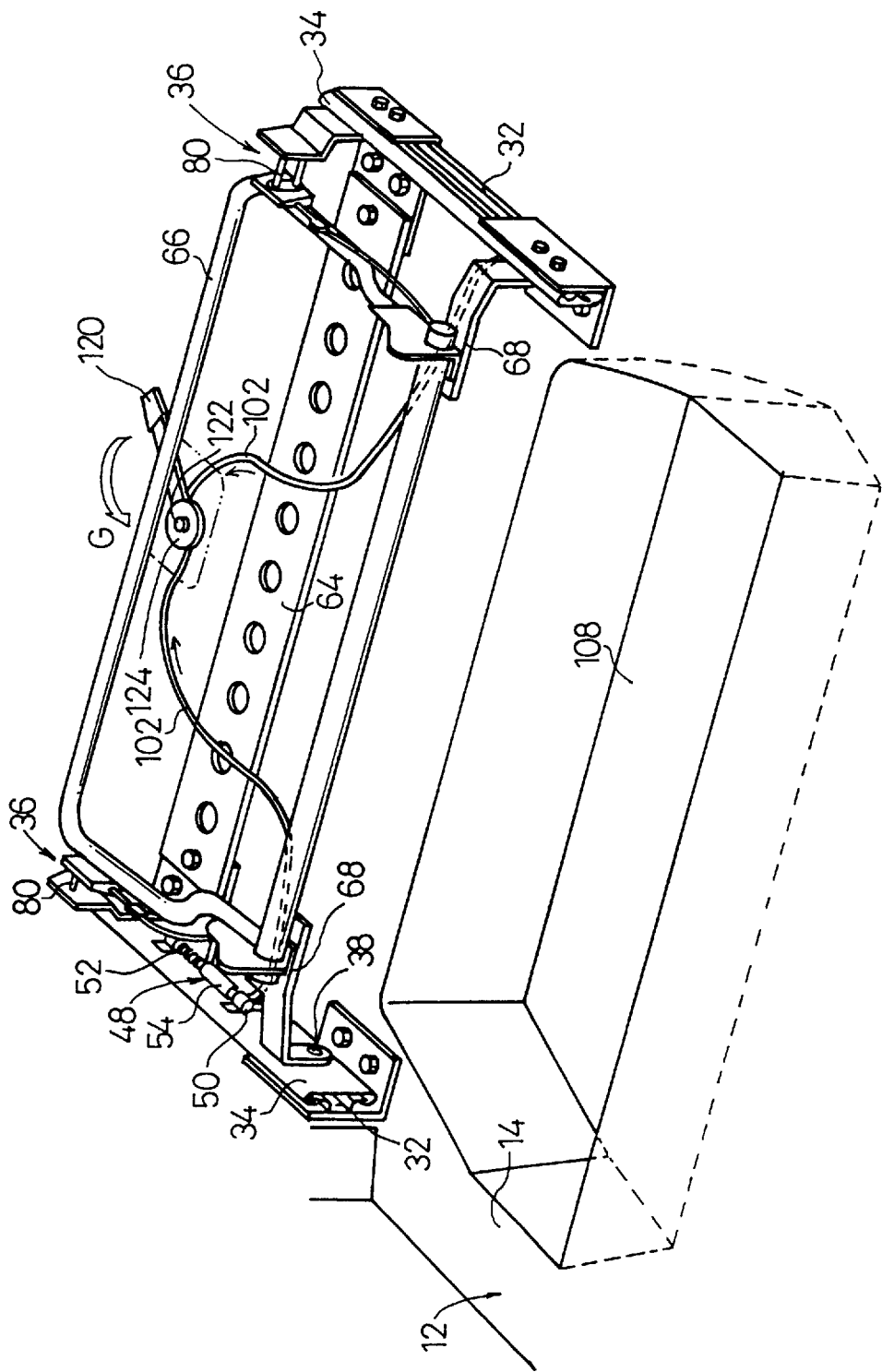

STORAGE STRUCTURE FOR MOTOR VEHICLE SEAT

BACKGROUND OF THE INVENTION

1. Field of the Invention

The present invention relates to a storage structure for storing a motor vehicle seat which comprises a seat cushion and a seatback that is foldable toward the seat cushion.

2. Description of the Related Art

In recent years, automobiles such as wagons, recreational vehicles, etc. have been in widespread use as passenger cars. Some of such automobiles have passenger's rear seats behind the driver's seat which are foldable forward to create a cargo room that provides a large space in combination with the rear floor of the automobile.

Japanese laid-open utility model publication No. 5-40029, for example, discloses a seat storage structure having a storage cavity defined in the floor of a passenger car. According to the disclosed seat storage structure, a seat having a seat cushion and a seatback is positioned in the vicinity of the storage cavity, and, with the seatback folded toward the seat cushion, the seat cushion is swung into the storage cavity until the bottom surface of the seat cushion lies flush with the floor.

Passenger's rear seats for motor vehicles should preferably be slidable or otherwise adjustable in position in the longitudinal direction of the motor vehicles to accommodate various body sizes of possible passengers and allow passengers to get on and off the motor vehicles with ease. The above disclosed seat storage structure, however, is addressed to rear seats with no slidable structure, and cannot be incorporated in rear seats that can be moved in the longitudinal direction of the motor vehicles.

As shown in FIG. 26 of the accompanying drawings, a conventional seat storage structure for a seat 3 having a seat cushion 1 and a seatback 2 stores the seat 3 in a storage cavity 5 when the seat 3 is swung backward about a hinge 4 with the seatback 2 folded against the seat cushion 1. The hinge 4 needs to be positioned as closely to a floor 6 of a cargo room as possible so that the hinge 4 does not project above the floor 6 when the seat 3 is stored in the storage cavity 5.

Since the hinge 4 is positioned closely to the floor 6, however, there is almost no gap between the seat cushion 1 and the floor 6 when the seat cushion 1 is kept in a normal position in which a passenger can be seated on the seat cushion 1. As a result, any space for accommodating a long object or the like cannot be provided below the seat cushion 1.

Because the hinge 4 is positioned closely to the floor 6, furthermore, the floor 6 is required to have a downwardly stepped surface 7 in front of the seat 3 to permit a passenger to be seated on the seat 3 with comfort. Any process of manufacturing the floor 6 with the downwardly stepped surface 7 is considerably complex to carry out.

SUMMARY OF THE INVENTION

It is a general object of the present invention to provide a storage structure which is relatively simple and capable of easily and reliably storing a motor vehicle seat that has a seat cushion and a seatback and is movable back and forth in the longitudinal direction of a motor vehicle which incorporates such a storage structure.

A major object of the present invention is to provide a storage structure for storing a motor vehicle seat, which provides an effective space defined below a seat cushion when the seat is in a normal position and which also provides an effective cargo space when the seat is stored in a seat storage cavity of the storage structure.

The above and other objects, features, and advantages of the present invention will become apparent from the following description when taken in conjunction with the accompanying drawings in which preferred embodiments of the present invention are shown by way of example.

BRIEF DESCRIPTION OF THE DRAWINGS

FIG. 13 is a perspective view illustrating the manner in which the holding mechanism operates;

FIG. 14 is a perspective view of a storage structure according to a second embodiment of the present invention;

DETAILED DESCRIPTION OF THE PREFERRED EMBODIMENTS

Figure 1:
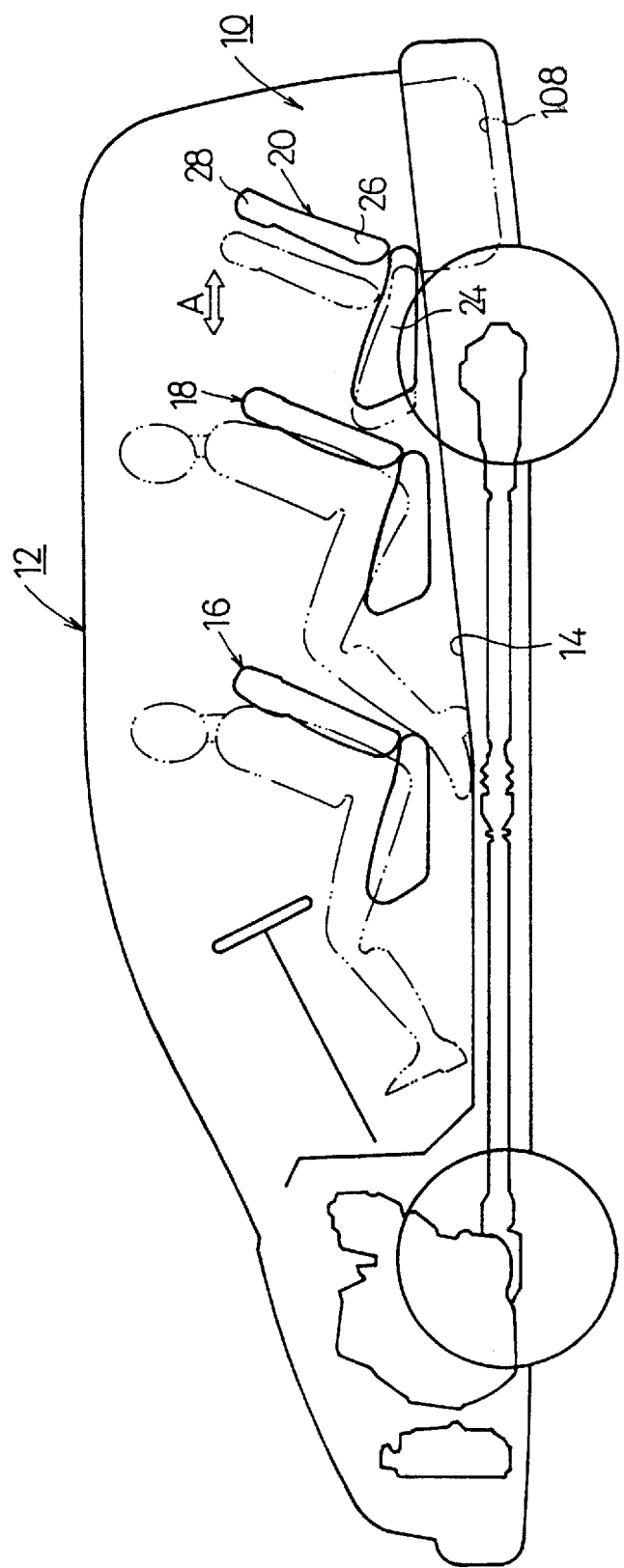
FIG. 1 is a schematic side elevational view of a motor vehicle which incorporates a storage structure according to a first embodiment of the present invention.

FIG. 1 schematically shows a motor vehicle 12 which incorporates a storage structure 10 according to a first embodiment of the present invention. The motor vehicle 12 has a floor 14 supporting thereon front seats 16, a first rear seat 18, and a second rear seat 20 which are arranged successively in three rows in the longitudinal direction indicated by the arrow A of the motor vehicle 12. The storage structure 10 is associated with the second rear seat 20.

Figure 2:
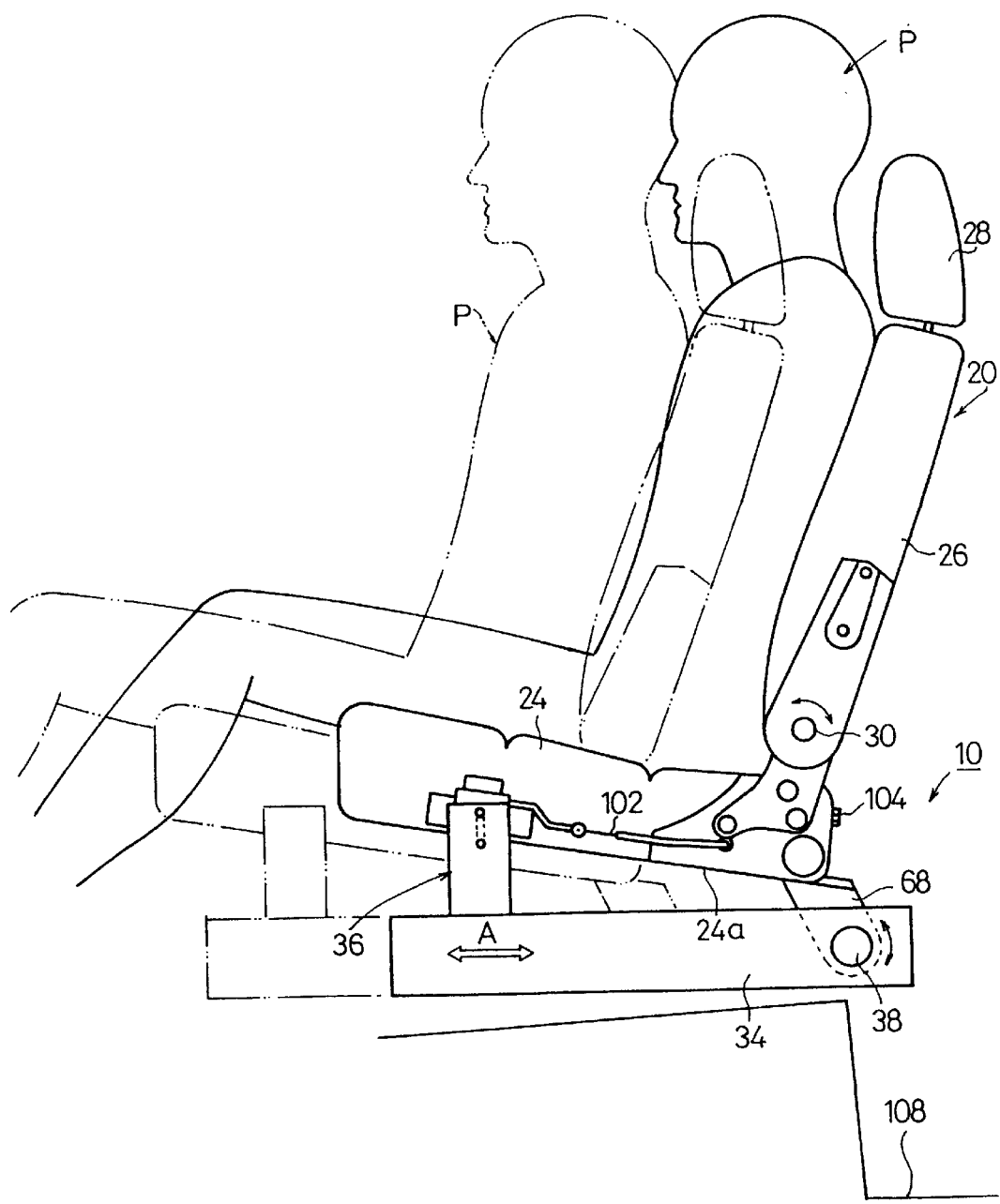
FIG. 2 is a side elevational view of a second rear seat of the motor vehicle shown in FIG. 1.
Figure 3:
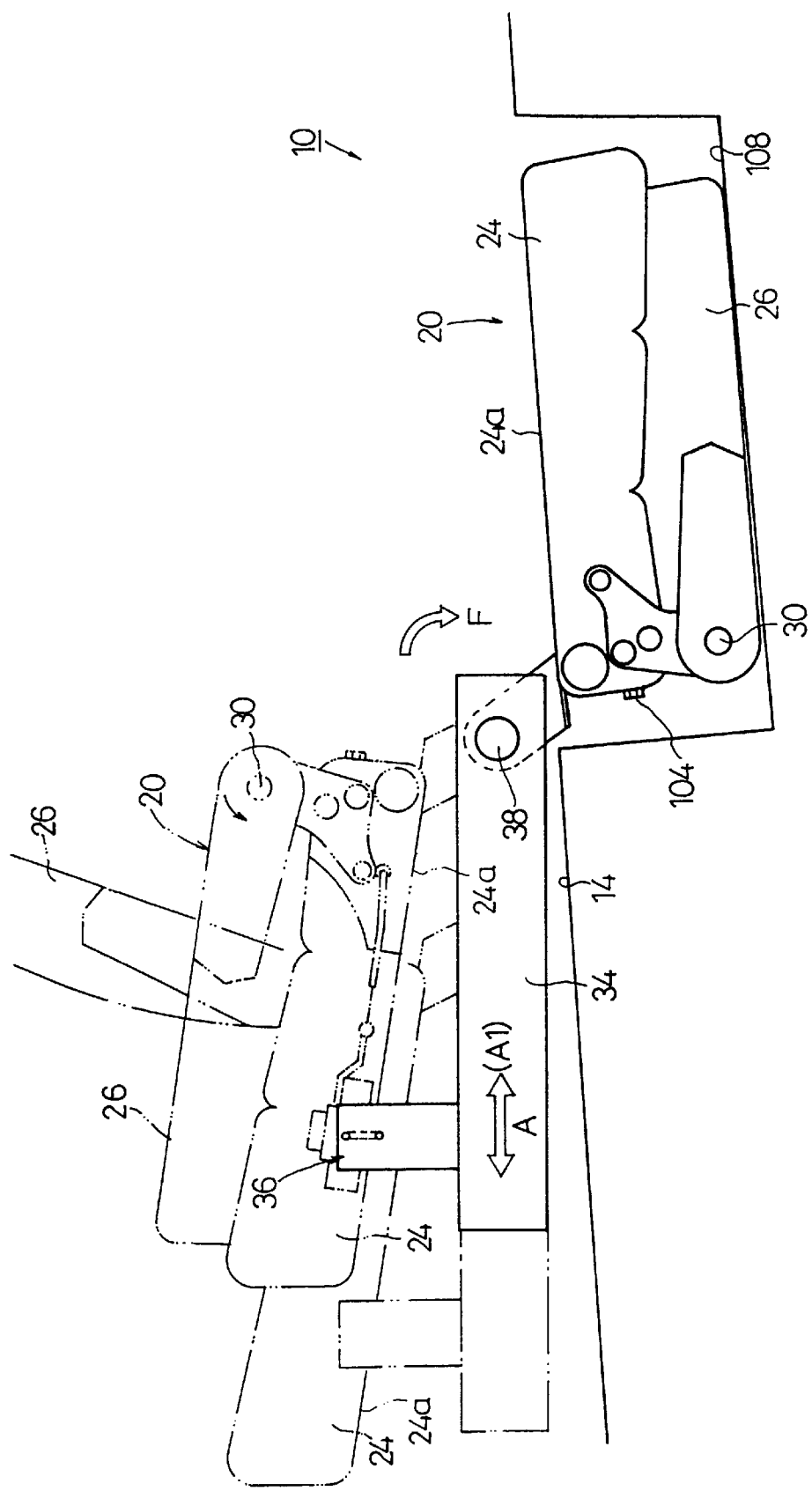
FIG. 3 is a schematic side elevational view of the storage structure according to the first embodiment.

As shown in FIGS. 2 and 3, the second rear seat 20 comprises a seat cushion 24, a seatback 26 hinged to the seat cushion 24, and headrests 28 detachably mounted on an upper edge of the seatback 26. The seatback 26 is foldable against the seat cushion 24 and tiltable backward about a shaft 30 by a reclining mechanism (not shown).

Figure 4:
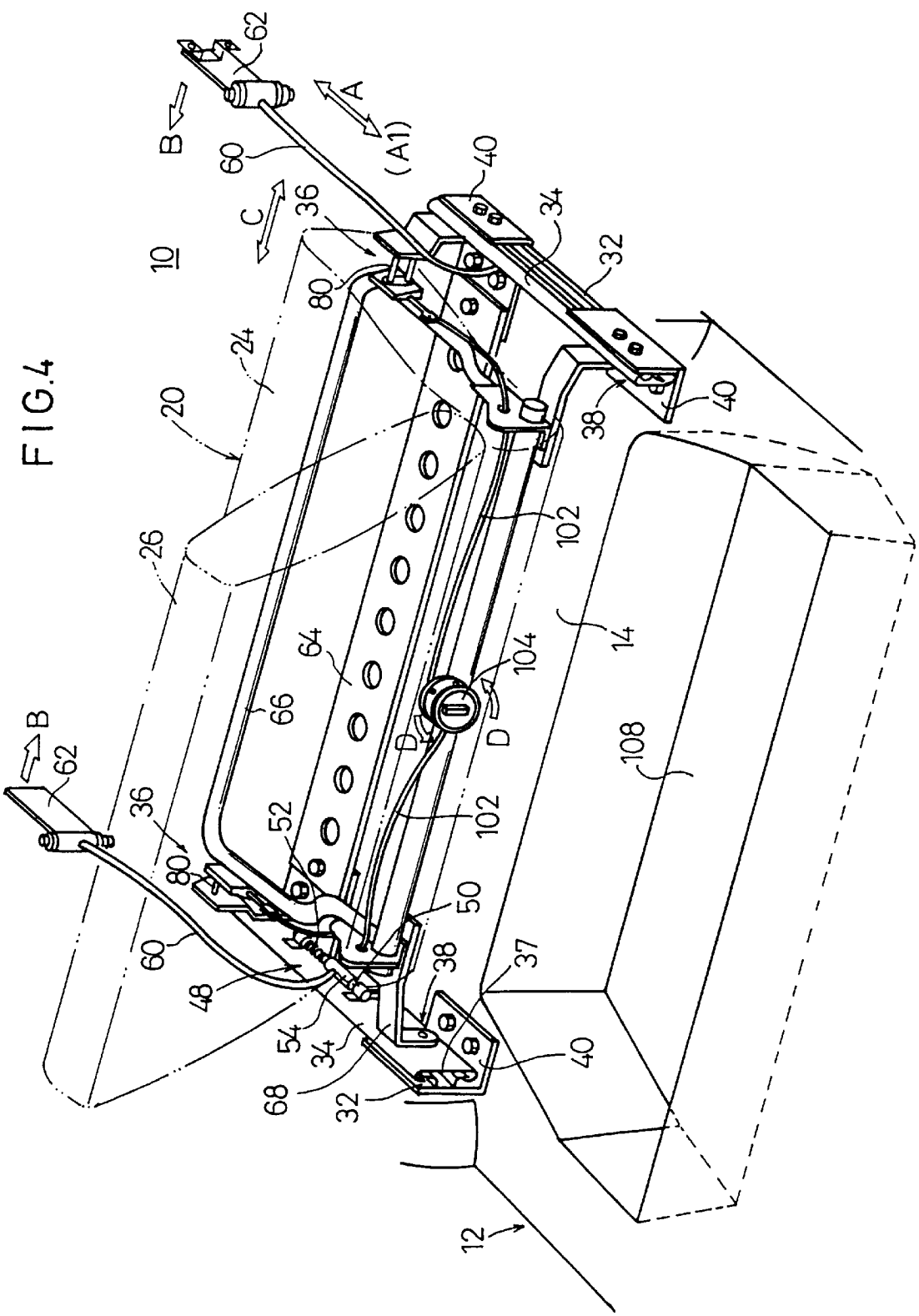
FIG. 4 is a perspective view of the storage structure according to the first embodiment.

As shown in FIG. 4, the storage structure 10 comprises a pair of fixed rails 32 fixedly mounted on the motor vehicle 12, a pair of movable rails 34 slidably engaging and movable along the fixed rails 32, respectively, for sliding movement in the longitudinal directions indicated by the arrow A, a pair of holding mechanisms 36 disposed on front ends of the movable rails 34 and the seat cushion 24, for fixing the seat cushion 24 to the movable rails 34, and a pair of pivot hinges 38 disposed between rear ends of the movable rails 34 and engaging portions 37 of the fixed rails 32, for swinging the seat cushion 24 thereabout when the seat cushion 24 is released from the holding mechanisms 36. The fixed rails 32, the movable rails 34, and the pivot hinges 38 jointly serve as a support means 39.

Figure 5:
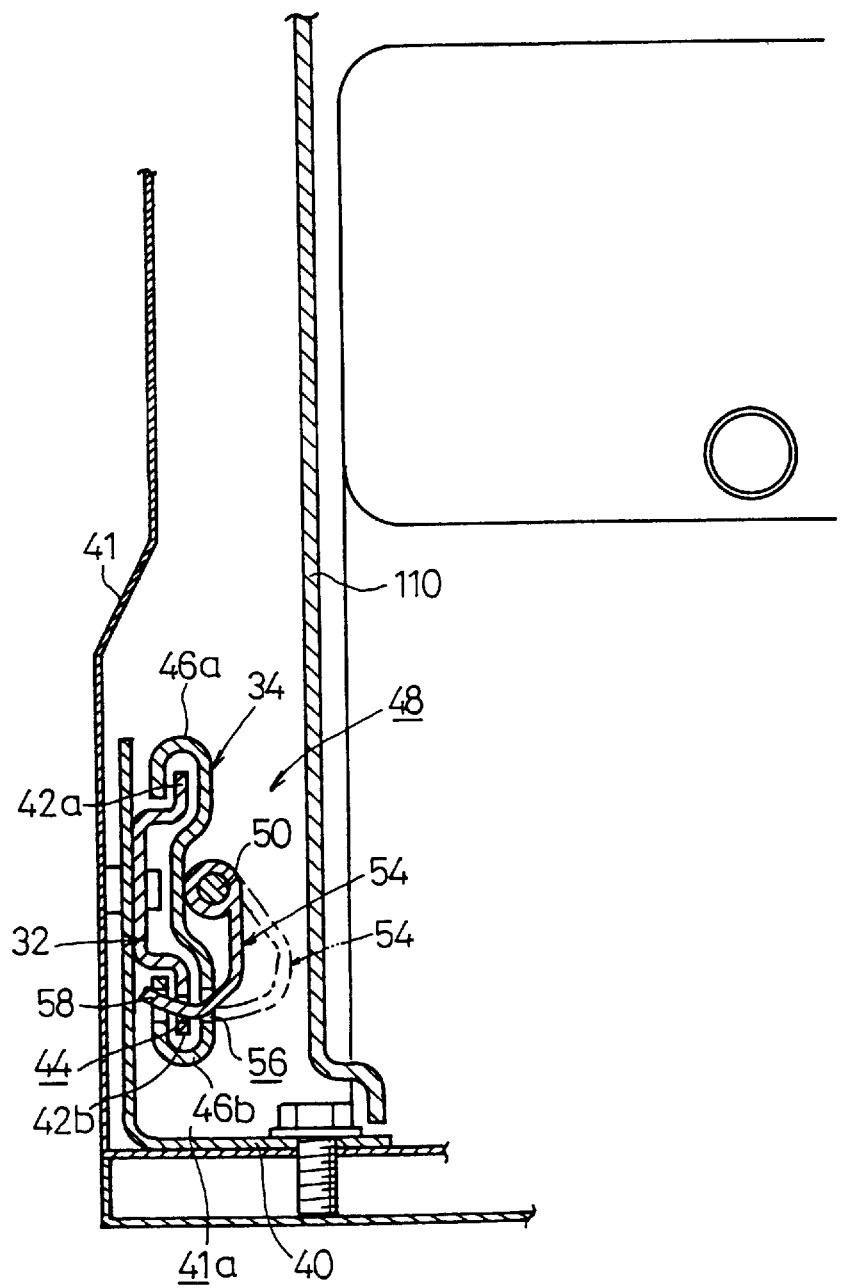
FIG. 5 is a cross-sectional view of a lock mechanism of the storage structure according to the first embodiment.

The fixed rails 32 are fixedly mounted on respective side panels 41 (see FIG. 5) of the motor vehicle 12 by respective attachment plates 40. As shown in FIG. 5, each of the side panels 41 and a side lining 110 which is spaced laterally inwardly from the side panel 41 define therebetween a housing space 41a which houses therein one of the fixed rails 32 and a corresponding one of the movable rails 34. The fixed rail 32 has an upper flange 42a projecting vertically upwardly and a lower flange 42b projecting vertically downwardly. The upper and lower flanges 42a, 42b extend longitudinally along the fixed rail 32. The lower flange 42b has a plurality of through holes 44 defined therein and arrayed at constant intervals in the longitudinal directions indicated by the arrow A. The movable rail 34 has an upper bent edge 46a surrounding the upper flange 42a of the fixed rail 32 and a lower bent edge 46b surrounding the lower flange 42b of the fixed rail 32. The upper and lower bent edges 46a, 46b extend longitudinally along the movable rail 34. A lock mechanism 48 is mounted on each of the movable rails 34 for securing the movable rail 34 to the corresponding fixed rail 32 at a desired position therealong. As shown in FIGS. 4 and 5, the lock mechanism 48 comprises a support shaft 50 with its opposite ends supported by the movable rail 34 and a lock wing 54 normally urged into a solid-line position in FIG. 5 by a torsion spring 52 helically coiled around the support shaft 50.

The lock wing 54 has a plurality of fingers 58 which can be fitted into a predetermined number of through holes 56 defined in the lower bent edge 46 of the movable rail 34 and an arbitrary number of the through holes 44 defined in the lower flange 42b of the fixed rail 32.

As shown in FIG. 4, a tension wire 60 has an end joined to the lock wing 54 and an opposite end connected to an actuating knob 62. When the actuating knob 62 is angularly moved in the direction indicated by the arrow B, the tension wire 60 angularly moves the lock wing 54 from the solid-line position to a two-dot-and-dash-line position (FIG. 5) in which the fingers 58 are displaced out of the holes 44, thereby unlocking the movable rail 34 from the fixed rail 32.

Figure 6:
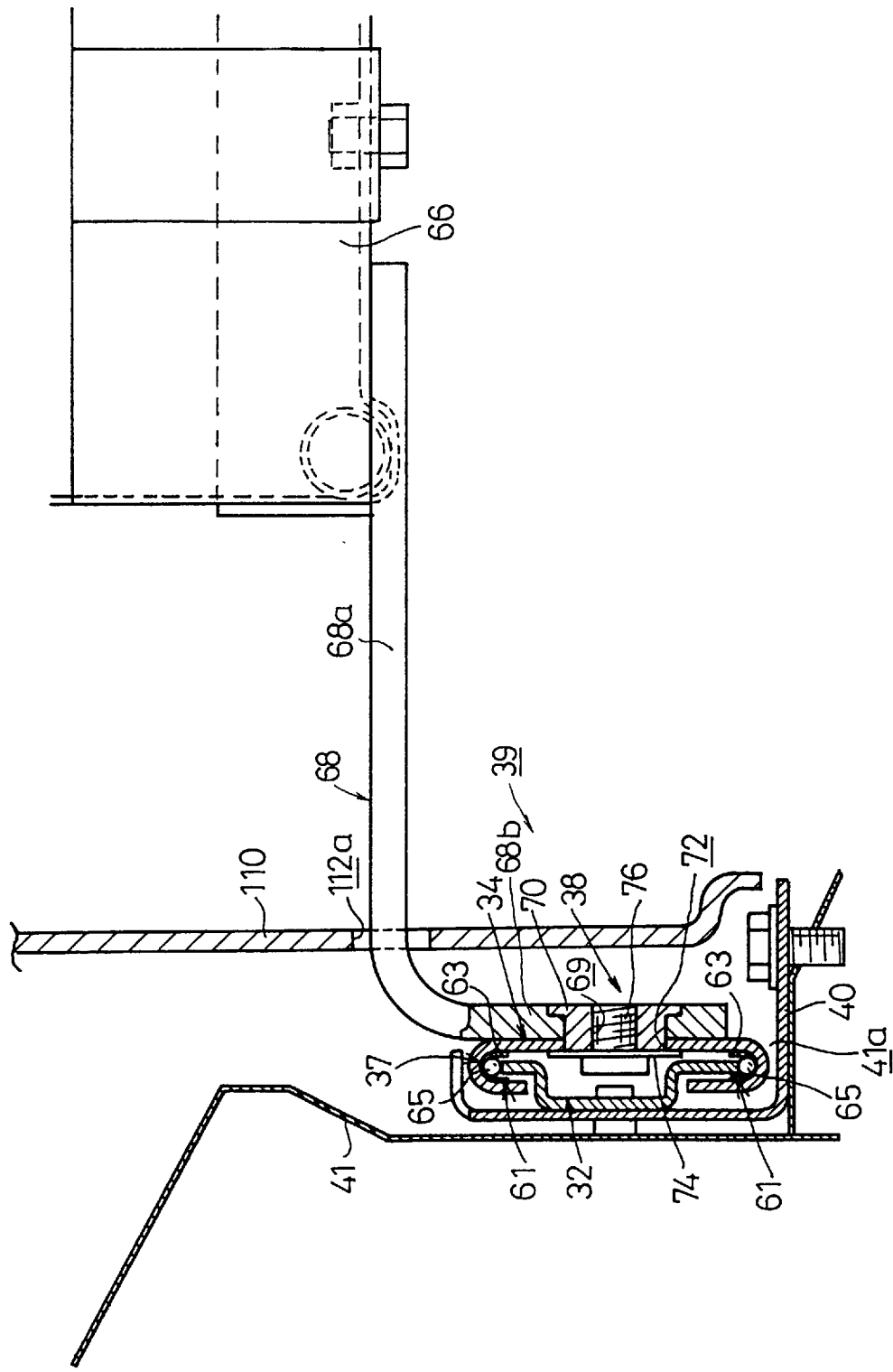
FIG. 6 is a cross-sectional view of a pivot hinge of the storage structure according to the first embodiment.
Figure 7:
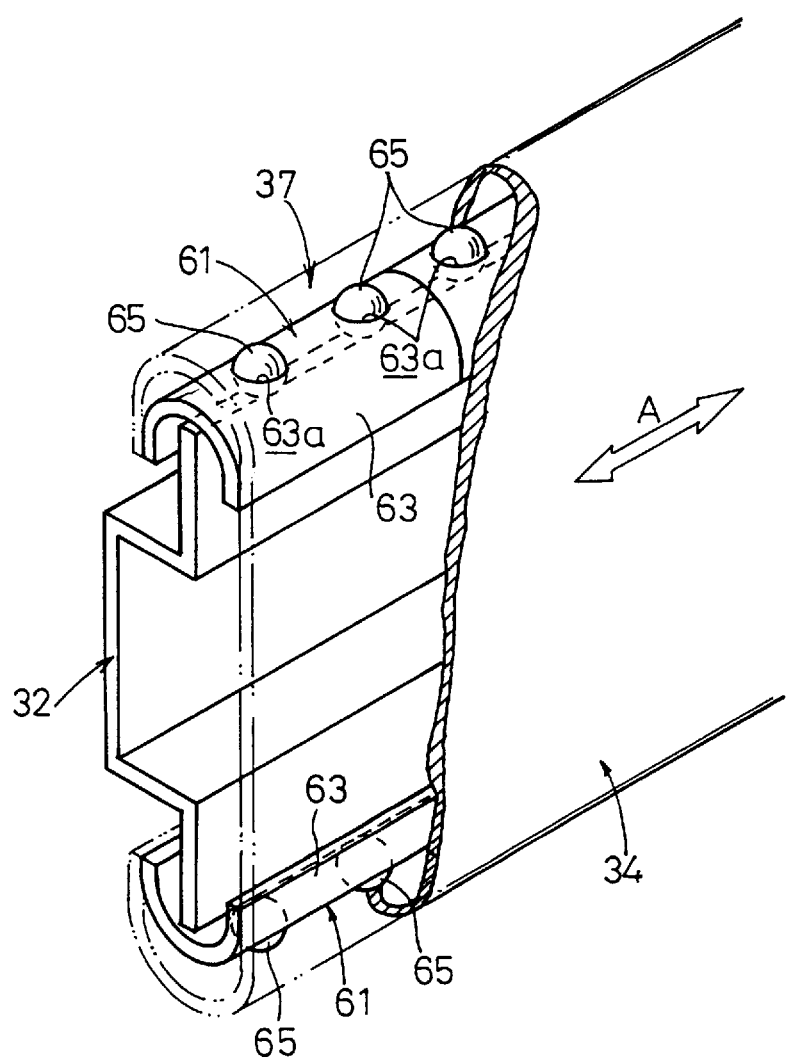
FIG. 7 is a fragmentary perspective view of fixed and movable rails, which engage each other, of the storage structure according to the first embodiment.

As shown in FIGS. 6 and 7, retainers 61 are disposed between each of the fixed rails 32 and the engaging portions 37 of each of the movable rails 34. Each of the retainers 61 comprises an arcuate sleeve 63 fixed to the movable rail 34 (or the fixed rail 32), and a plurality of balls 65 fitted in respective holes 63a defined in the sleeve 63 and engaging the upper flange 42a or the lower flange 42b of the fixed rail 32 and the upper bent edge 46a or the lower bent edge 46b of the movable rail 34.

As shown in FIG. 4, a reinforcing plate 64 extending transversely of the motor vehicle 12 as indicated by the arrow C is disposed in the seat cushion 24, and a substantially C-shaped frame pipe 66 extending along the edges of the seat cushion 24 is disposed in the seat cushion 24. The frame pipe 66 has rear opposite ends secured to ends of respective brackets 68. As shown in FIG. 6, each of the brackets 68 is of a substantially L shape and has an extension 68a extending transversely outwardly of the seat cushion 24 and a turn arm 68b integral with an outer end of the extension 68a and angularly movably supported by the corresponding movable rail 34 such that the turn arm 68b extends downwardly when the seat cushion 24 is kept in a normal position in which a passenger can be seated thereon. The turn arm 68b has a stepped hole 69 defined therein which is oriented transversely of the motor vehicle 12, and a sleeve 70, which serves as one of the pivot hinges 38, is fitted in the stepped hole 69. The sleeve 70 is also fitted in a hole 72 defined in the movable rail 34. A setscrew 76 with a washer 74 is threaded into the sleeve 70 from the side of the movable rail 34, thereby holding the sleeve 70 in the turn arm 68b and the movable rail 34.

Figure 8:
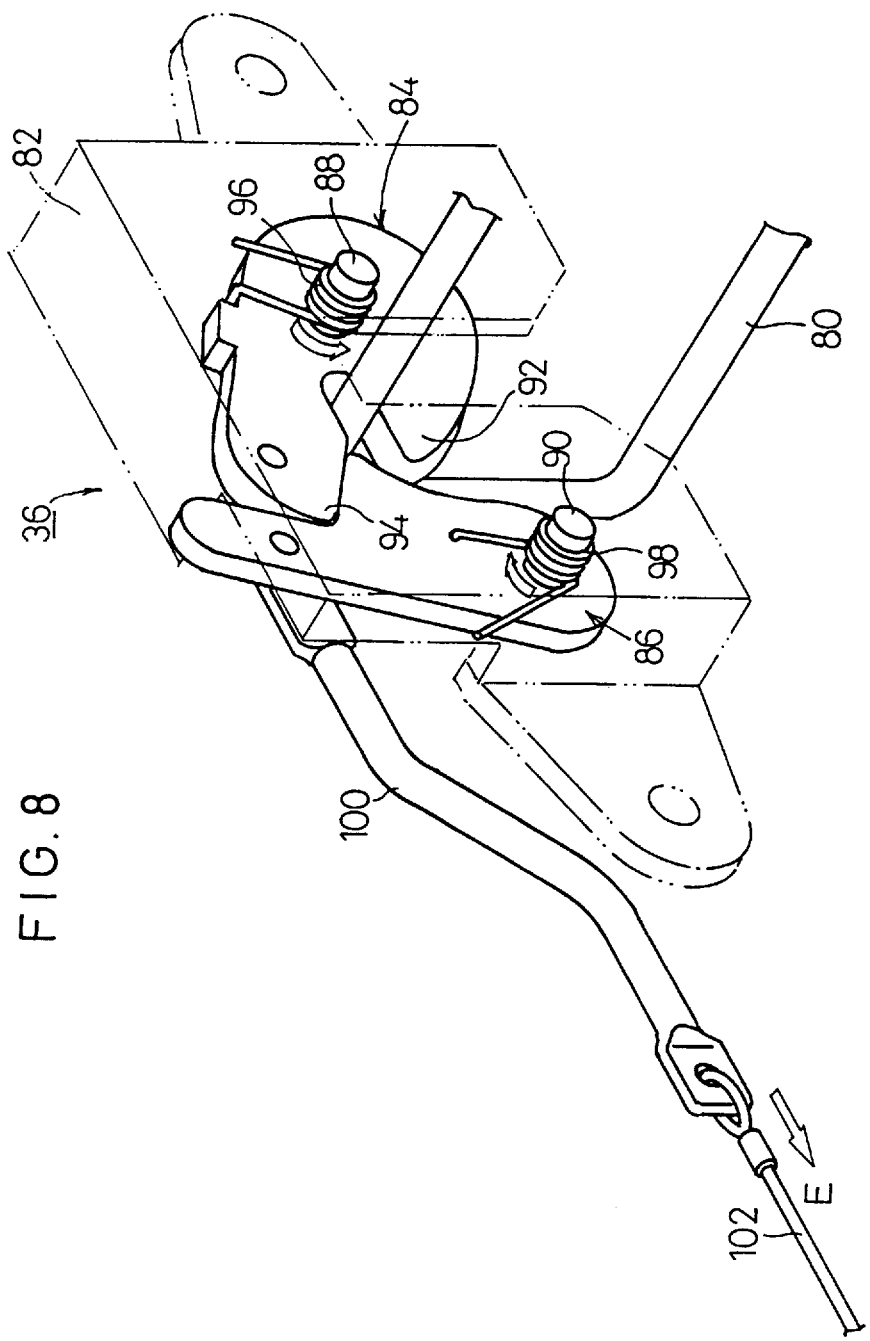
FIG. 8 is a perspective view of a holding mechanism of the storage structure according to the first embodiment.

As shown in FIGS. 4 and 8, each of the holding mechanisms 36 comprises a striker 80 connected to one of the movable rails 34, and a bracket 82 fixed to the front end of one of the opposite sides of the seat cushion 24. A latch 84 and a cam 86 are angularly movably supported on the bracket 82 by respective shafts 88, 90. The latch 84 has a finger 94 for engaging the striker 80 and a lobe-shaped cam follower 92 held in engagement with the cam 86. The latch 84 is normally biased to turn counterclockwise in the direction indicated by the arrow in FIG. 8 by a torsion spring 96 helically coiled around the shaft 88.

The cam 86 is normally biased to turn clockwise in the direction indicated by the arrow in FIG. 8 by a torsion spring 98 helically coiled around the shaft 90. A lever 100 has an end engaging an end of the cam 86 and an opposite end joined to an end of an actuating wire 102. As shown in FIG. 4, the actuating wire 102 extends backward along one of the sides of the seat cushion 24 and then laterally along an rear end of the seat cushion 24, and has an opposite end coupled to an unlock knob 104 which is rotatably mounted centrally on the rear end of the seat cushion 24. When the unlock knob 104 is turned in the direction indicated by the arrow D, the cams 86 which are disposed on the respective opposite sides of the seat cushion 24 are turned about the shafts 90 in a direction opposite to the direction indicated by the arrow in FIG. 8.

As shown in FIGS. 1 through 4, a seat storage cavity 108 is defined in the floor 14 behind the second rear seat 20 as it is in a normal attitude. The seat storage cavity 108 accommodates the second rear seat 20 therein until a bottom 24a of the second rear seat 20 lies flush with the floor 14 when the second rear seat 20 is folded and swung backward.

Figure 9:
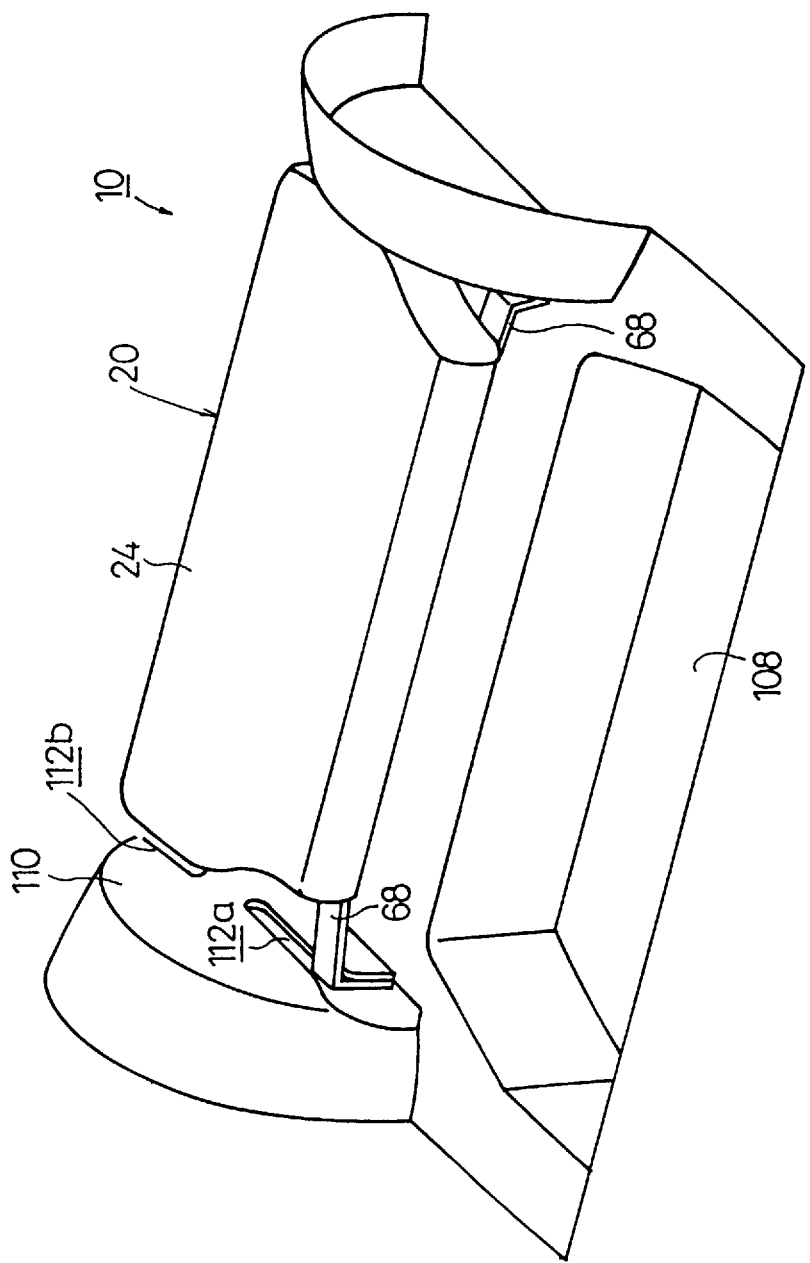
FIG. 9 is a perspective view of a side lining of the storage structure according to the first embodiment.

As shown in FIG. 9, the motor vehicle 12 has a side lining 110 which covers the fixed rails 32 and the movable rails 34. The side lining 110 has a pair of first openings 112a (one shown) through which the respective brackets 68 extend and a pair of second openings 112b (one shown) through which the strikers 80 of the holding mechanisms 36 project toward the seat cushion 24.

Operation of the storage structure 10 according to the first embodiment will be described below.

As shown in FIG. 2, when seated on the second rear seat 20, a passenger P can positionally adjust the second rear seat 20 in the longitudinal direction indicated by the arrow A of the motor vehicle 12. Specifically, as shown in FIG. 4, when the passenger P turns the actuating knobs 62 in the directions indicated by the arrows B, the tension wires 60 coupled to the actuating knobs 62 are pulled. Therefore, the lock wings 54 are turned from the solid-line position to the two-dot-and-dash-line position (FIG. 5) against the bias of the torsion springs 52. The fingers 58 of the lock wings 54 are now displaced out of the holes 44 in the fixed rails 32, thereby unlocking the movable rails 34 for sliding movement in the directions indicated by the arrow A with respect to the fixed rails 32.

Figure 10:
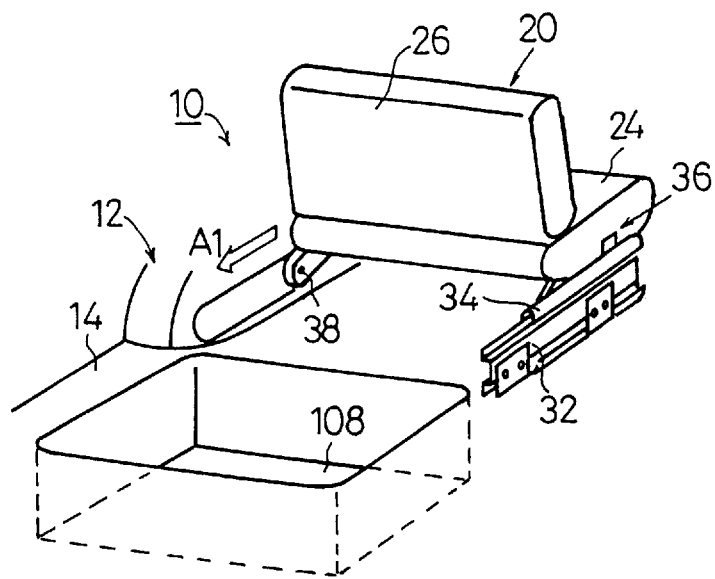
FIG. 10 is a perspective view of the second rear seat as it slides backward.
Figure 11:
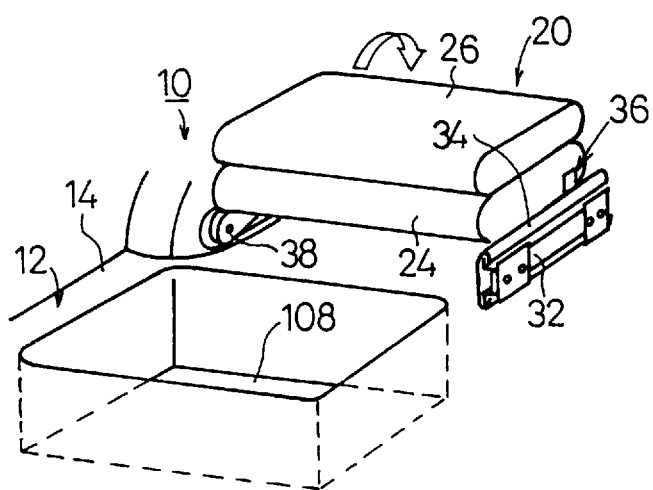
FIG. 11 is a perspective view of the second rear seat with its seatback folded against its seat cushion.

As shown in FIG. 10, the passenger P moves the second rear seat 20 in unison with the movable rails 34 backward in the longitudinal direction of the motor vehicle 12 as indicated by the arrow A1, and positions the pivot hinges 38 in the vicinity of a front edge of the seat storage cavity 108. To place the second rear seat 20 into the seat storage cavity 108, the passenger P removes the headrests 28 from the seatback 26, and then folds the seatback 26 forward onto the seat cushion 24 through the reclining mechanism (not shown), as shown in FIG. 11.

Thereafter, as shown in FIG. 4, the passenger P turns the unlock knob 104 counterclockwise in the direction indicated by the arrow D, pulling the actuating wires 102 joined to the unlock knob 104. The levers 100 connected to the actuating wires 102 are pulled in the direction indicated by the arrow E in FIG. 8. In each of the holding mechanisms 36, the cam 86 coupled to the lever 100 is turned in the direction opposite to the direction indicated by the arrow against the bias of the spring 98 until the cam 86 disengages from the finger 94 of the latch 84.

The latch 84 is now turned in the direction indicated by the arrow under the bias of the torsion spring 98 with the cam follower 92 held in engagement with the striker 80, whereupon the seat cushion 24 is released from the holding mechanisms 36 (see FIG. 13).

Figure 12:
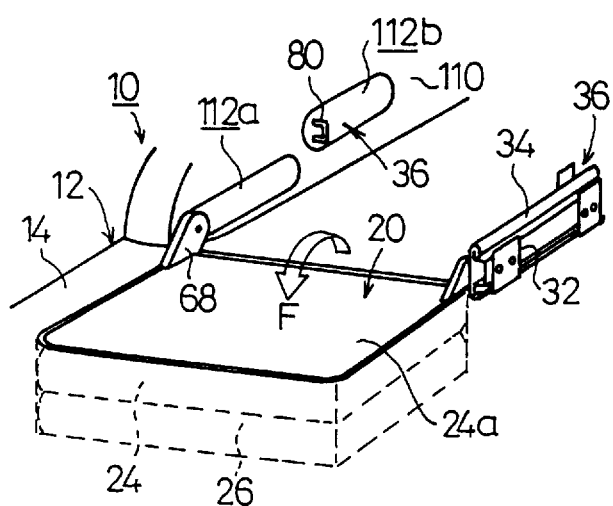
FIG. 12 is a perspective view of the second rear seat which is folded and swung into a storage cavity.

The passenger P then turns the seat cushion 24, on which the seatback 26 has been folded, backward in the direction indicated by the arrow F in FIGS. 3 and 12, about the pivot hinges 38 until the second rear seat 20 is housed in the seat storage cavity 108.

In the first embodiment, the movable rails 34 are movable in the directions indicated by the arrow A along the fixed rails 32 which are secured to the motor vehicle 12, and the front end of the seat cushion 24 is releasably secured to the movable rails 34 by the holding mechanisms 36, and the pivot hinges 38 are positioned on a rear portion of the seat cushion 24. Therefore, the second rear seat 20 is positionally adjustable in the directions indicated by the arrow A, and can easily and reliably be housed in the seat storage cavity 108 through the holding mechanisms 36 and the pivot hinges 38 which are of a highly simple structure that are disposed between the movable rails 34 and the seat cushion 24.

When the second rear seat 20 is stored in the seat storage cavity 108, the bottom 24a of the seat cushion 24 lies flush with the floor 14. Therefore, a considerably wide space is provided on the vehicle floor 14 and the bottom 24a of the seat cushion 24, and can conveniently be used as a cargo space or the like.

Since the seat storage cavity 108 is defined behind the second rear seat 20 when it is in the normal position, the seat storage cavity 108 will not be used as a footrest cavity which would otherwise be the case if defined in front of the second rear seat 20, and hence dirt such as shoe dirt will not be present in the seat storage cavity 108 and will not smear a rear surface of the seatback 26. The depth of the seat storage cavity 108 may thus be substantially equal to the thickness of the second rear seat 20 as it is folded (see FIG. 3). This allow the floor 14 to be low for providing an effective wide space for passengers.

The storage structure 10 is combined with the second rear seat 20 which is the rearmost seat in the motor vehicle 12. Therefore, the distance between the first and second rear seats 18, 20 can be reduced, making it possible to shorten the overall length of the motor vehicle 12. When the second rear seat 20 is not stored in the seat storage cavity 108, the seat storage cavity 108 itself can be used as a cargo space.

The pivot hinges 38 are disposed between the fixed rails 32 and the engaging portions 37 of the movable rails 34. Consequently, the pivot hinges 38 are firmly secured, and permit the second rear seat 20 to angularly move smoothly and accurately through an angle of about 180° without lateral wobbling movement. The second rear seat 20 is thus prevented from hitting the floor 14 when it is placed into the seat storage cavity 108.

As shown in FIGS. 9 and 12, the fixed rails 32 and the movable rails 34 are covered with the side lining 110. Therefore, when the second rear seat 20 as folded is stored in the seat storage cavity 108, the fixed rails 32 and the movable rails 34 are not exposed to view within the passenger's compartment of the motor vehicle 12 as shown in FIG. 12. Any cargo or the like placed in the cargo space is therefore prevented from being smeared or damaged by the fixed rails 32 and the movable rails 34 in contact therewith, and hence can effectively be held and safely be carried by the motor vehicle 12.

As shown in FIGS. 5 and 6, the housing spaces 41a are defined between the side panels 41 and the side lining 110 and accommodate therein the fixed rails 32 and the movable rails 34, and the extensions 68a of the brackets 68 extend outwardly in the transverse direction into the housing spaces 41a. Therefore, the side lining 110 is not required to have convex portions which would otherwise be needed to accommodate the fixed rails 32, the movable rails 34, and the extensions 68a. The side lining 110 free of such convex portions allows the second rear seat 20 to have a relatively large width. The pivot hinges 38 of the storage structure 10 do not project into the passenger's compartment, permitting a flat and wide floor space to be created as a cargo space, for example, in the passenger's compartment.

When the second rear seat 20 is stored in the seat storage cavity 108, the pivot hinges 38 of the storage structure 10 are not exposed in the passenger's compartment. As a result, the pivot hinges 38 can be positioned at a relatively high location above the floor 14. When the seat cushion 24 is kept in the normal position in which the passenger P can be seated on the seat cushion 1 as indicated by the two-dot-and-dash lines in FIG. 2, a space is created between the bottom 24a of the seat cushion 24 and the floor 14 for accommodating an elongate object, for example, below the seat cushion 24. Furthermore, inasmuch as the seat cushion 24 in the normal position is in an elevated vertical location above the floor 14, the floor 14 is not required to have a stepped footrest cavity for passengers seated on the second rear seat 20.

In the first embodiment, the two actuating knobs 62 are employed for releasing the lock mechanisms 48 as shown in FIG. 4. However, as shown in FIG. 14, a single lever 120 may be used to release the lock mechanisms 48 in a storage structure according to a second embodiment of the present invention.

In the second embodiment, the lever 120 is angularly movably mounted substantially centrally on the front end of the seat cushion 24 by a pivot 122 which has a rotor 124. Ends of the actuating wires 102 are connected to the rotor 124 at substantially diametrically opposite positions thereon. The actuating wires 102 have other ends connected to the respective levers 100 (see FIG. 8) as in the first embodiment. Other structural details of the storage structure according to the second embodiment are identical to those of the storage structure according to the first embodiment, and those parts of the storage structure according to the second embodiment which are identical to those of the storage structure according to the first embodiment are denoted by identical reference characters and will not be described in detail below.

According to the second embodiment, when the single lever 120 is turned in the direction indicated by the arrow G, the rotor 124 coupled thereto is also turned to wind the actuating wires 102. The lock mechanisms 48 disposed on the respective opposite sides of the seat cushion 24 are actuated, releasing the movable rails 34 for sliding movement in the directions indicated by the arrow A with respect to the fixed rails 32. Accordingly, the storage structure according to the second embodiment allows the lock mechanisms 48 to be unlocked with the single lever 120 more easily than the storage structure according to the first embodiment which has two actuating knobs 62.

Figure 15A:
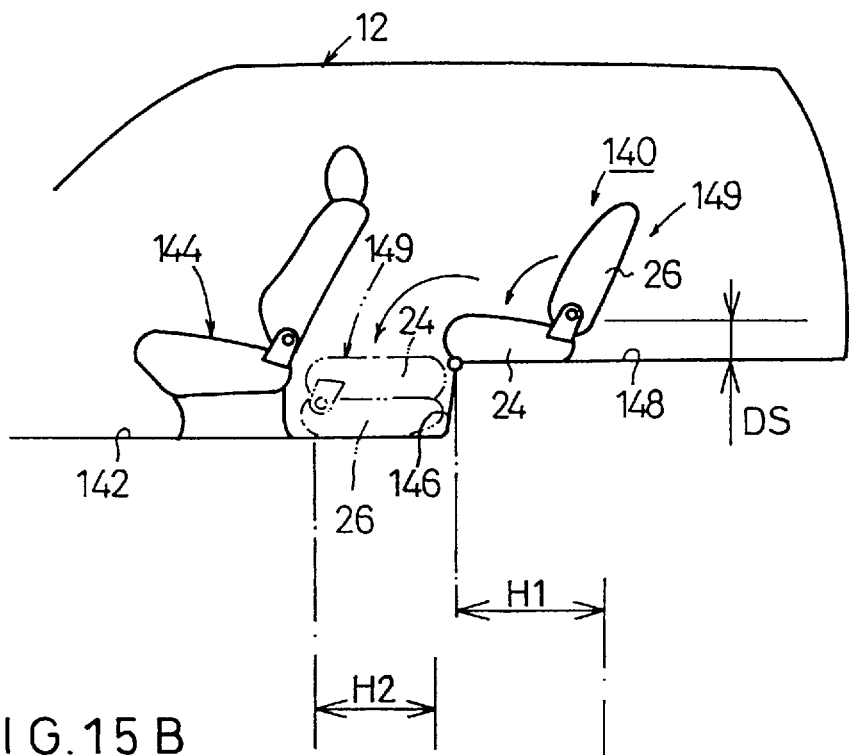
FIG. 15A is a schematic side elevational view of a storage structure according to a third embodiment of the present invention.
Figure 16:
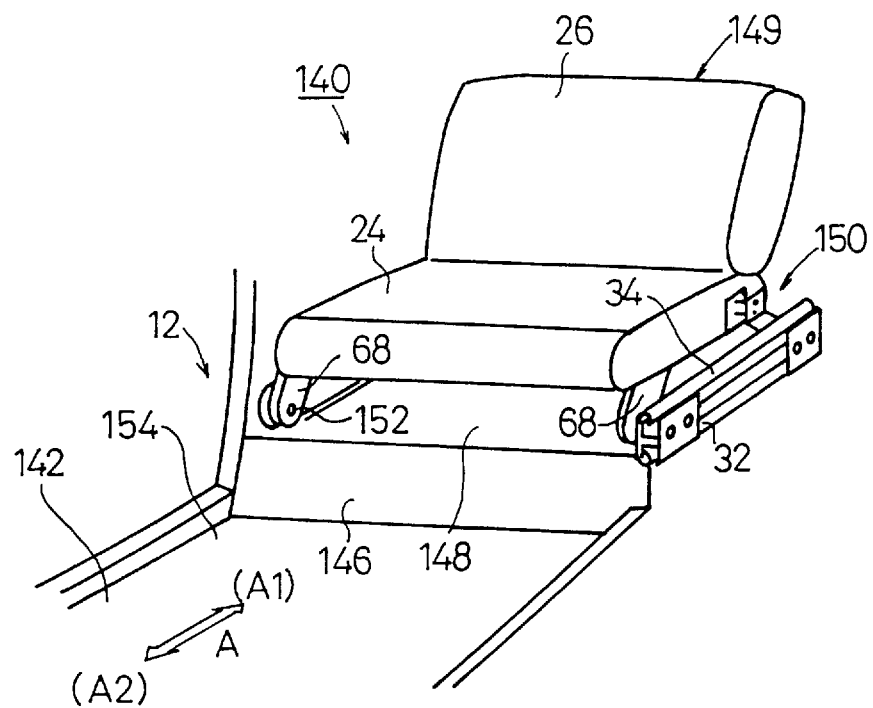
FIG. 16 is a perspective view of the storage structure according to the third embodiment.
Figure 17:
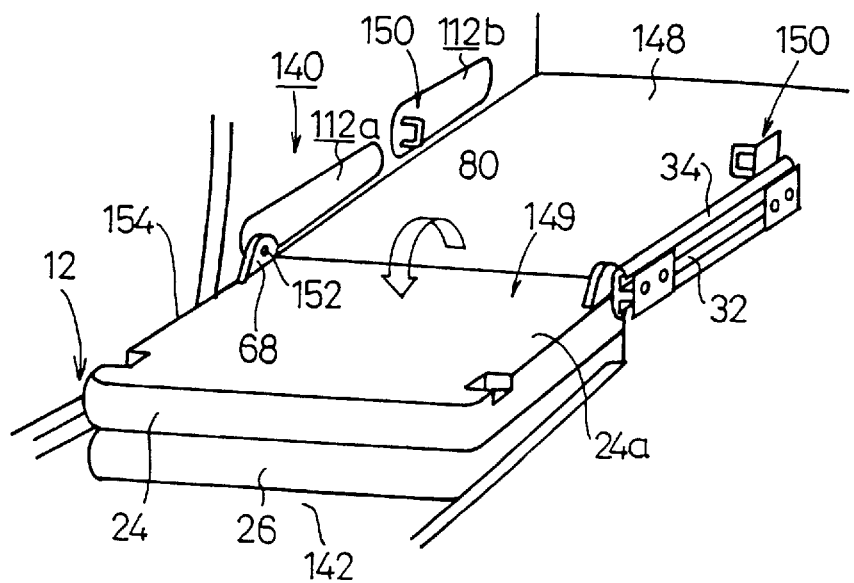
FIG. 17 is a perspective view showing the manner in which the storage structure according to the third embodiment operates.

FIGS. 15A, 16, and 17 show a storage structure 140 according to a third embodiment of the present invention. According to the third embodiment, a front seat 144 is mounted on a first floor 142 in a front portion of a motor vehicle 12, and a rear seat 149 which is foldable and angularly movable forward is mounted on a second floor 148 which extends rearward from the first floor 142 and lies higher than the first floor 142 with a vertical step 146 positioned therebetween. Those parts of the storage structure according to the third embodiment which are identical to those of the storage structure according to the first embodiment are denoted by identical reference characters and will not be described in detail below.

The storage structure 140 comprises holding mechanisms 150 disposed on rear portions of the movable rails 34 in the longitudinal direction of the motor vehicle 12 as indicated by the arrow A1 in FIG. 16, for fixing the seat cushion 24 to the movable rails 34, and pivot hinges 152 disposed on front portions of the movable rails 34 in the longitudinal direction of the motor vehicle 12 as indicated by the arrow A2 in FIG. 16, for allowing the seat cushion 24, on which the seatback 26 has been folded, to swing forward with the seat cushion 24 released by the holding mechanisms 150.

A seat storage cavity 154 is defined by the vertical step 146 and the first floor 142 in front of the rear seat 149. The vertical step 146 has a height selected such that the bottom 24a of the seat cushion 24 lies flush with the second floor 148 when the rear seat 149 is folded and stored in the seat storage cavity 154.

The storage structure 140 operates as follows: The rear seat 149 is moved in the direction indicated by the arrow A2 until the pivot hinges 152 are positioned near a rear edge of the seat storage cavity 154. Then, the seatback 26 is folded onto the seat cushion 24 by the non-illustrated reclining mechanism, after which the seat cushion 24 is released by the holding mechanisms 150. The releasing action of the holding mechanisms 150 is the same as the releasing action of the holding mechanisms 36 according to the first embodiment.

The seat cushion 24, on which the seatback 26 has been folded, is swung forward about the pivot hinges 152 on the front end of the seat cushion 24 and stored into the seat storage cavity 154 (see FIGS. 15A and 17).

In the third embodiment, since the rear seat 149 as folded is placed in the seat storage cavity 154 in front of the rear seat 149, the second floor 148 including a region where the seat cushion 24 of the rear seat 149 is normally positioned may effectively be used as a rigid cargo floor.

Figure 15B:
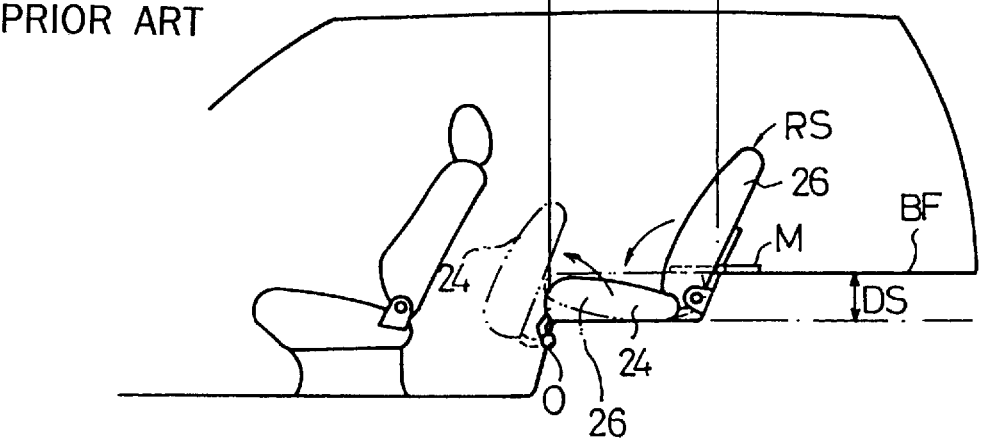
FIG. 15B is a schematic side elevational view of a conventional storage structure.

FIG. 15B shows a conventional storage structure for folding and storing a rear seat RS to provide a cargo room in front of the rear seat RS. In the illustrated conventional storage structure, after a seat cushion 24 of the rear seat RS is lifted about front pivots 0, a seatback 26 thereof is folded forward as indicated by the broken line in FIG. 15B.

Therefore, the rear seat RS cannot be moved in the longitudinal directions of the motor vehicle and cannot be reclined. As shown in FIG. 15B, the seatback 26 is supported by a rear floor BF which is relatively high, and a foldable shield member M is provided to close a gap between a rear surface 26a of the seatback 26 and the rear floor BF. Therefore, a dead space DS is present beneath the rear floor BF, thereby vertically limiting the cargo space.

According to the third embodiment, the rear seat 149 is folded and stored in its entirety onto the first floor 142. Therefore, the second floor 148 as a whole can be used as a cargo floor which is horizontally greater than the conventional cargo floor by a distance H1, providing a flat cargo floor which is horizontally greater than the conventional flat cargo floor by a distance H2, and eliminating the dead space DS thereby to increase the height of the cargo space. In addition, the rear seat 149 is movable in the longitudinal directions of the motor vehicle 12 and has its seatback 26 reclinable.

Figure 18:
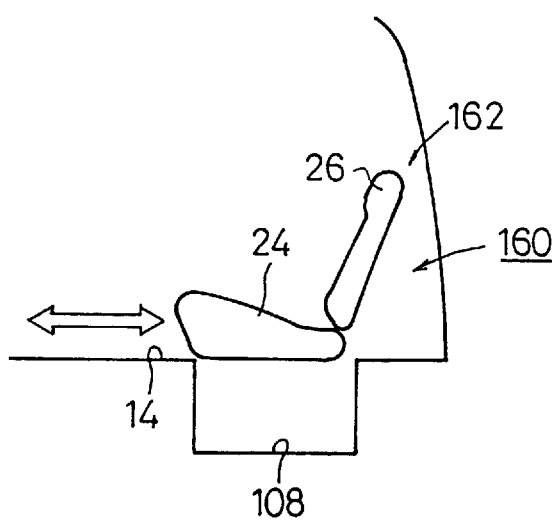
FIG. 18 is a schematic side elevational view of a storage structure according to a fourth embodiment of the present invention.

FIG. 18 shows a storage structure 160 according to a fourth embodiment of the present invention. Those parts of the storage structure according to the fourth embodiment which are identical to those of the storage structure according to the first embodiment are denoted by identical reference characters and will not be described in detail below.

In the storage structure 160, a rear seat 162 is slidable to a position in which it can cover the seat storage cavity 108, for allowing a wider space of the passenger's compartment to be used more efficiently.

Figure 19:
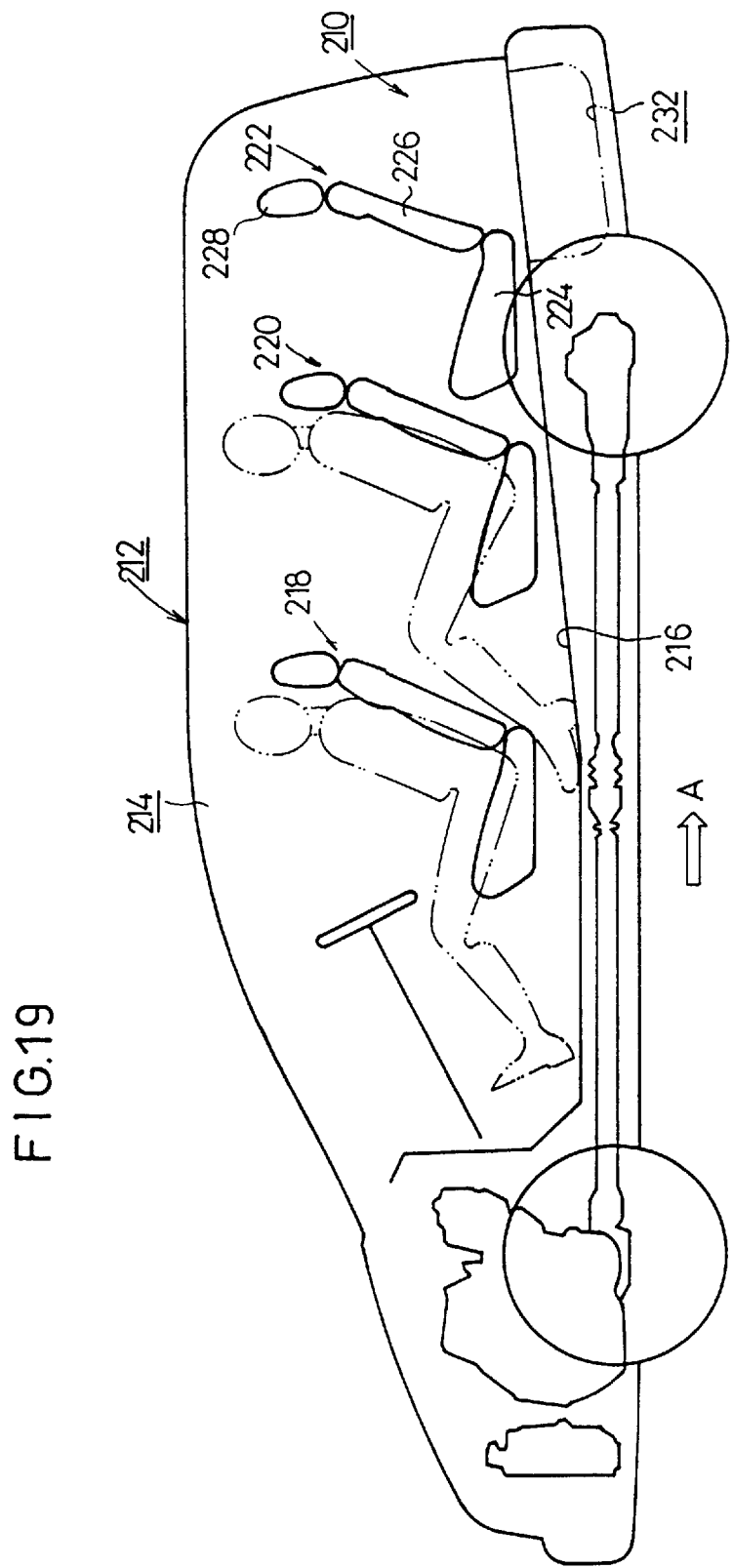
FIG. 19 is a schematic side elevational view of a motor vehicle which incorporates a storage structure according to a fifth embodiment of the present invention.

FIG. 19 schematically shows a motor vehicle 212 which incorporates a storage structure 210 according to a fifth embodiment of the present invention. The motor vehicle 212 includes a passenger's compartment 214 which has a floor 216 supporting thereon front seats 218, a first rear seat 220, and a second rear seat 222 which are arranged successively in three rows in the longitudinal direction indicated by the arrow A of the motor vehicle 12. The storage structure 212 is associated with the second rear seat 222.

Figure 20:
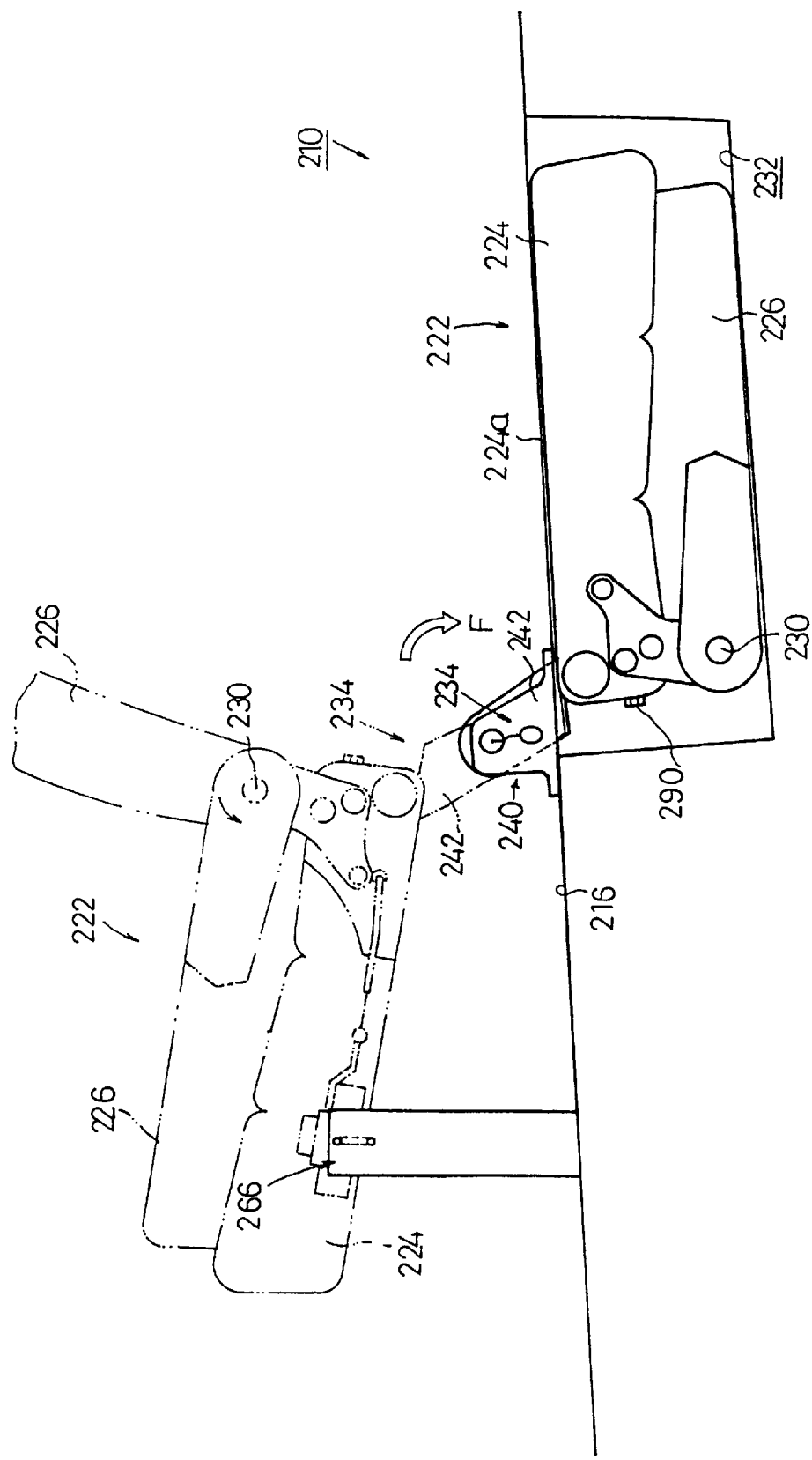
FIG. 20 is a side elevational view of the storage structure according to the fifth embodiment.

As shown in FIGS. 19 and 20, the second rear seat 222 comprises a seat cushion 224, a seatback 226 hinged to the seat cushion 224, and headrests 228 detachably mounted on an upper edge of the seatback 226. The seatback 226 is foldable against the seat cushion 224 and tiltable backward about a shaft 230 by a reclining mechanism (not shown). The floor 216 has a seat storage cavity 232 defined therein behind the second rear seat 222 for accommodating the second rear seat 222 as it is folded.

As shown in FIGS. 21 through 24, the storage structure 210 comprises a pair of brackets 234 fixed to the seat cushion 224, a pair of housing spaces 238 defined by a side lining 236 within the passenger's compartment 214, and a pair of support members 240 disposed in the respective housing spaces 238.

Each of the brackets 234 is fixed to a bottom 224a of the seat cushion 224 by a fastener (not shown), and has an extension 242 extending transversely outwardly of the seat cushion 224 in the direction indicated by the arrow B and a turn arm 244 integral with an outer end of the extension 242 and angularly movably supported by the corresponding support member 240 such that the turn arm 244 extends downwardly when the seat cushion 224 is kept in a normal position in which a passenger can be seated thereon. The turn arm 244 has a hole 246 defined therein which is oriented transversely of the motor vehicle 212.

The side lining 236 terminates at a position above the floor 216, and the housing spaces 238 are defined between rear wheel housings 248, the floor 216, and lower ends of the side lining 236.

Figure 22:
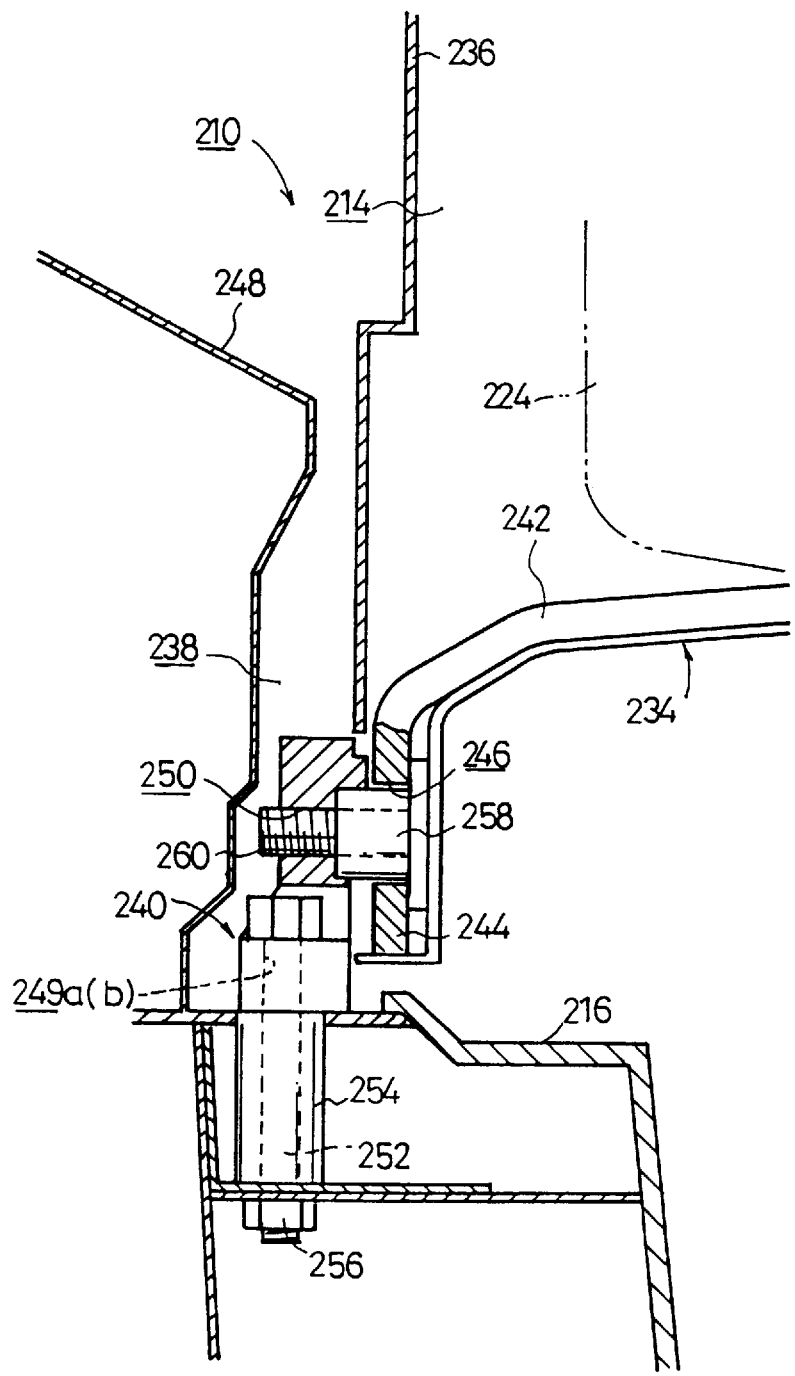
FIG. 22 is a fragmentary cross-sectional view of the storage structure according to the fifth embodiment.
Figure 23:
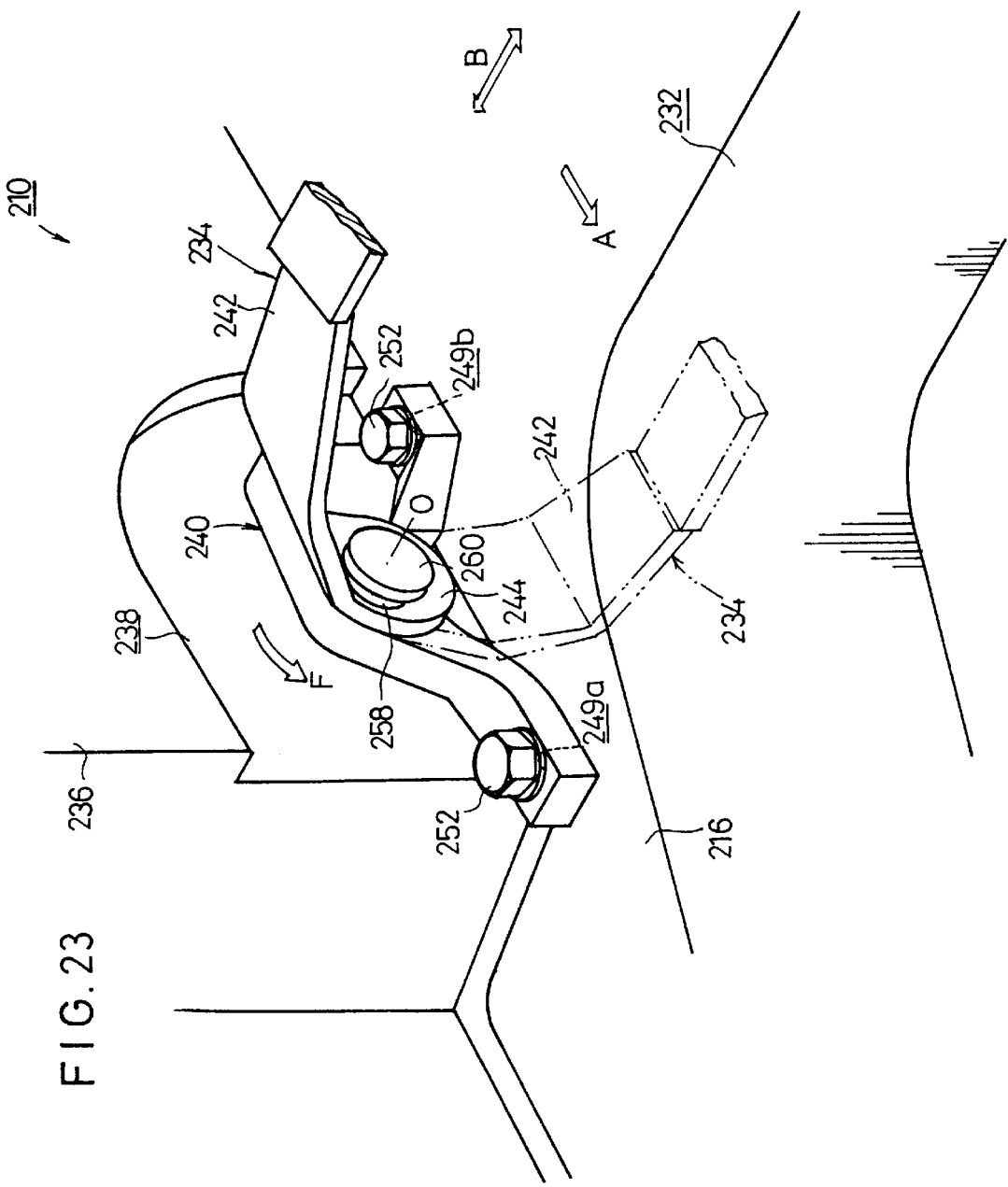
FIG. 23 is a fragmentary perspective view of the storage structure according to the fifth embodiment.
Figure 24:
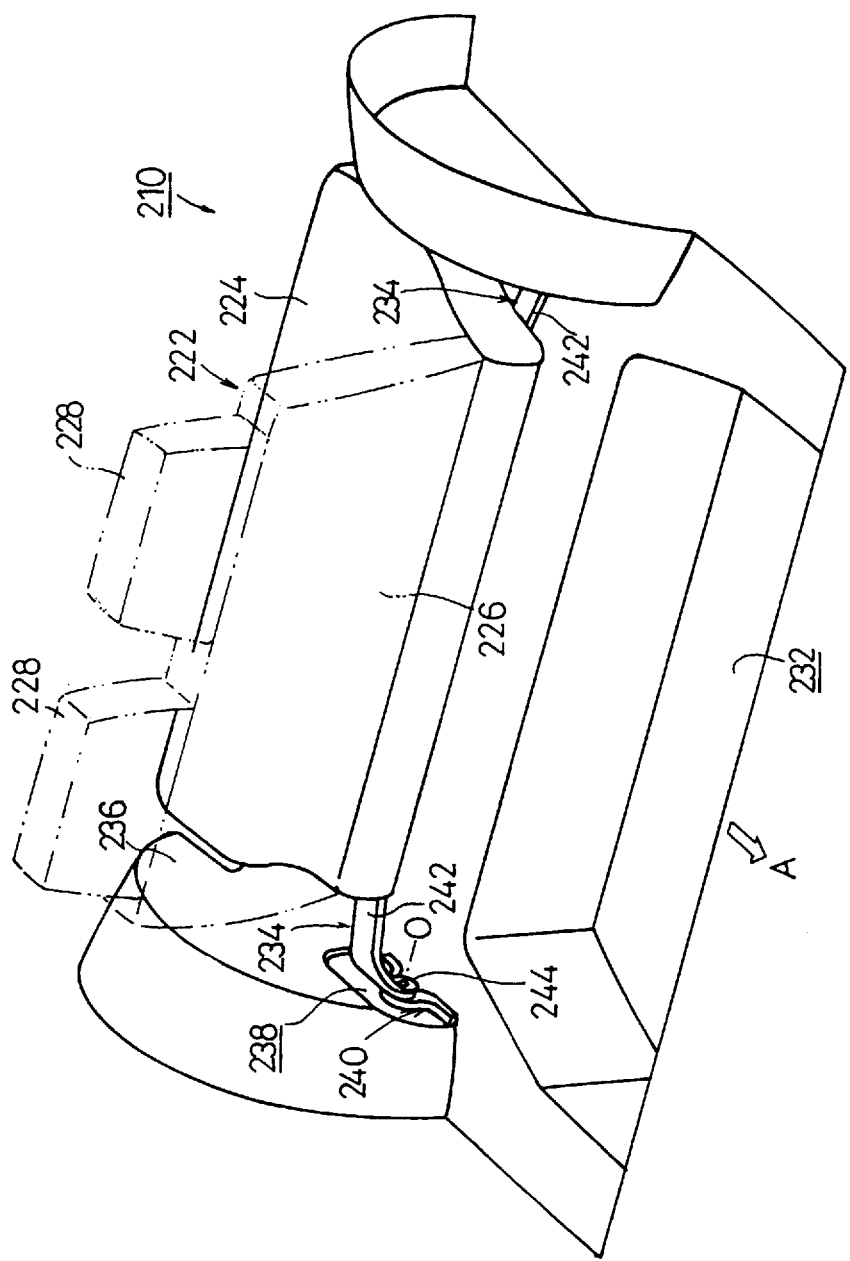
FIG. 24 is a rear perspective view of the storage structure according to the fifth embodiment.

As shown in FIGS. 22 and 23, each of the support members 240 is of a bent shape, and has two bolt insertion holes 249a, 249b extending vertically and a threaded hole 250 extending horizontally in the transverse direction of the motor vehicle 212. Bolts 252 inserted respectively in the bolt insertion holes 249a, 249b have tip ends extending through the floor 216 into respective collars 254 and threaded in respective nuts 256, thereby securing the support member 240 to the floor 216.

A sleeve 258 is inserted in the hole 246 defined in the turn arm 244. A setscrew 260 inserted in the sleeve 258 is threaded into the threaded hole 250 in the support member 240. The sleeve 258 provides a pivot hinge 0 for the bracket 234.

Figure 21:
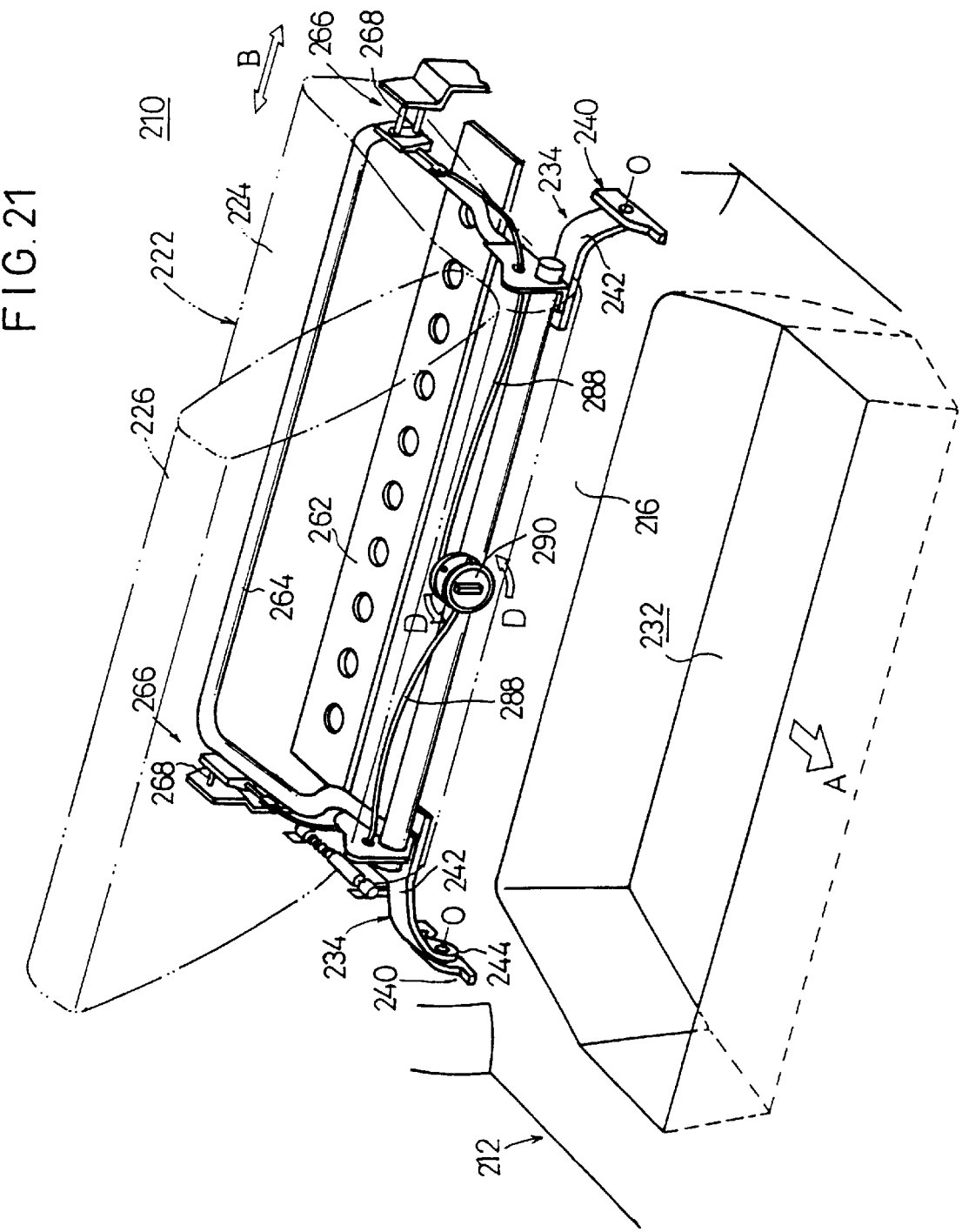
FIG. 21 is a perspective view of the storage structure according to the fifth embodiment.

As shown in FIG. 21, a reinforcing plate 262 extending transversely of the motor vehicle 212 is disposed in the seat cushion 224, and a substantially C-shaped frame pipe 264 extending along the edges of the seat cushion 224 is disposed in the seat cushion 224. The frame pipe 264 has rear opposite ends secured to ends of the respective brackets 234. Holding mechanisms 266 for fixing the seat cushion 224 are mounted on respective front opposite ends of the frame pipe 264.

Figure 25:
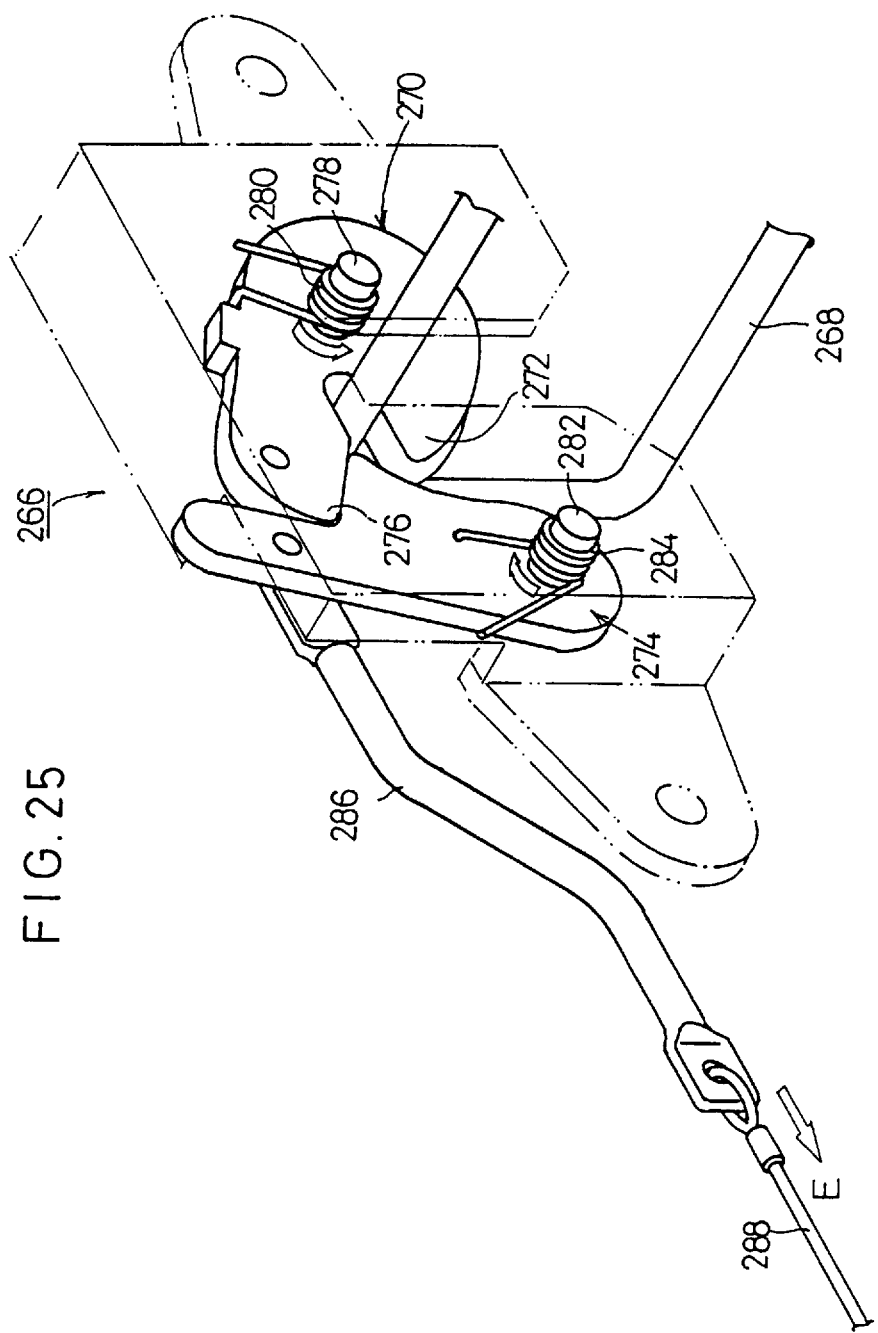
FIG. 25 is a perspective view of a holding mechanism of the storage structure according to the fifth embodiment.
Figure 26:
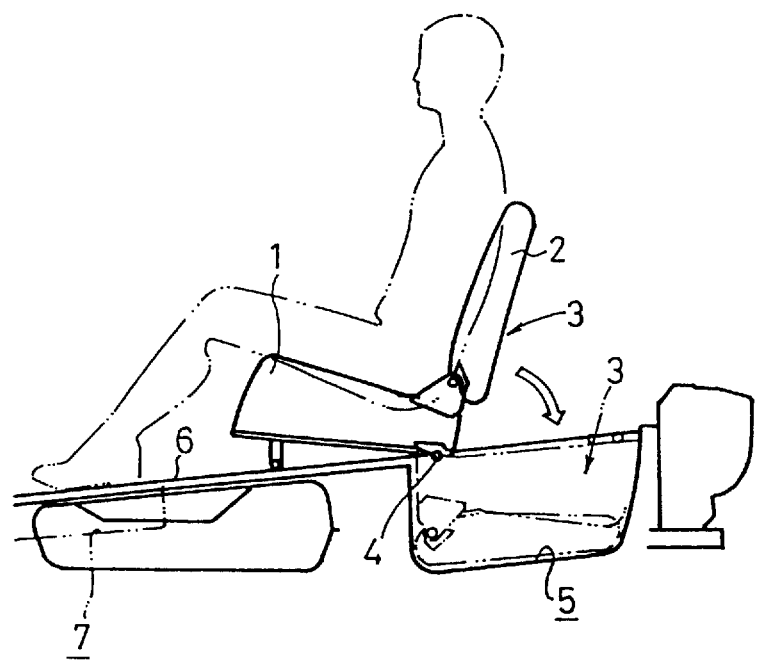
FIG. 26 is a side elevational view of a conventional storage structure.

As shown in FIGS. 21 and 25, each of the holding mechanisms 266 has a latch 270 engageable with and disengageable from a striker 268 on the motor vehicle 212. The latch 270 has a finger 276 for engaging the striker 268 and a lobe-shaped cam follower 272 held in engagement with a cam 274. The latch 270 is normally biased to turn counterclockwise in the direction indicated by the arrow in FIG. 25 by a torsion spring 280 helically coiled around a shaft 278.

The cam 274 is normally biased to turn clockwise in the direction indicated by the arrow in FIG. 25 by a torsion spring 284 helically coiled around a shaft 282. A lever 286 has an end engaging an end of the cam 274 and an opposite end joined to an end of an actuating wire 288. As shown in FIG. 21, the actuating wire 288 extends backward along one of the sides of the seat cushion 224 and then laterally along an rear end of the seat cushion 224, and has an opposite end coupled to an unlock knob 290 which is rotatably mounted centrally on the rear end of the seat cushion 224. When the unlock knob 290 is turned in the direction indicated by the arrow D, the cams 274 which are disposed on the respective opposite sides of the seat cushion 224 are turned about the shafts 282 in a direction opposite to the direction indicated by the arrow in FIG. 25.

Operation of the storage structure 210 according to the fifth embodiment will be described below.

For placing the second rear seat 222 into the seat storage cavity 232, the passenger removes the headrests 228 from the seatback 226, and then folds the seatback 226 forward onto the seat cushion 224 through the reclining mechanism (not shown), as shown in FIG. 20.

Thereafter, as shown in FIG. 21, the passenger turns the unlock knob 290 counterclockwise in the direction indicated by the arrow D, pulling the actuating wires 288 joined to the unlock knob 290. The levers 286 connected to the actuating wires 288 are pulled in the direction indicated by the arrow E in FIG. 25. In each of the holding mechanisms 266, the cam 274 coupled to the lever 286 is turned in the direction opposite to the direction indicated by the arrow against the bias of the spring 284 until the cam 274 disengages from the finger 276 of the latch 270.

The latch 270 is now turned in the direction indicated by the arrow under the bias of the torsion spring 280 with the cam follower 272 held in engagement with the striker 268, whereupon the seat cushion 224 is released from the holding mechanisms 266.

The passenger then turns the seat cushion 224, on which the seatback 226 has been folded, backward in the direction indicated by the arrow F in FIGS. 20 and 23, about the pivot hinges 0 until the second rear seat 222 is housed in the seat storage cavity 232 with the bottom 224a of the seat cushion 224 lying substantially flush with the floor 216.

In the fifth embodiment, the support members 240 of the storage structure 210 are fixed to the floor 216 in the housing spaces 238, and the brackets 234 have the extensions 242 extending outwardly transversely of the motor vehicle 212 from the ends of the seat cushion 224, and the turn arms 244 extending from the ends of the extensions 242 are angularly movably supported by the support members 240.

When the second rear seat 222 is stored in the seat storage cavity 232, a considerably wide space is provided on the floor 216 and the bottom 224a of the seat cushion 224, and the pivot hinges by which the support members 240 and the turn arms 244 are angularly movably coupled to each other do not project into the passenger's compartment 214. Therefore, a flat and wide cargo floor is created in the passenger's compartment 214.

In the fifth embodiment, as described above, when the second rear seat 222 is stored in the seat storage cavity 232, a considerably wide space is provided on the floor 216 and the bottom 224a of the seat cushion 224. A cargo space is also provided below the seat cushion 224 when it is kept in the normal position in which a passenger can be seated thereon. The storage structure 210 is of a relatively simple structure and has many functions as with the storage structure 10 according to the first embodiment.

Although certain preferred embodiments of the present invention has been shown and described in detail, it should be understood that various changes and modifications may be made therein without departing from the scope of the appended claims.

We claim:

1. A storage structure for storing a motor vehicle seat which has a seat cushion and a seatback foldable against the seat cushion and is movable in a longitudinal direction of a motor vehicle, comprising:

a fixed rail fixed to the motor vehicle;

a movable rail movable along said fixed rail;

holding means disposed on a longitudinal end of said movable rail and the seat cushion, for selectively fixing said seat cushion to said movable rail; and a pivot hinge disposed between an opposite longitudinal end of said movable rail and an engaging portion of said fixed rail, for allowing said seat cushion to swing thereabout with said seat cushion being released by said holding means.

2. A storage structure according to claim 1, further comprising:

a floor on which said fixed rail is mounted; and a seat storage cavity defined near said pivot hinge in a position lower than said floor.

3. A storage structure according to claim 1, further comprising:

a bracket fixed to said seat cushion;

said bracket has an extension extending outwardly transversely of the motor vehicle from an end of said seat cushion, and a turn arm integral with an end of said extension and supported by said pivot hinge such that said turn arm extends downwardly when said seat cushion is kept in a position in which a passenger can be seated thereon.

4. A storage structure according to claim 3, wherein said pivot hinge includes a sleeve fitted in said turn arm and said movable rail.

5. A storage structure according to claim 1, wherein said holding means engages a front end of said seat cushion in the longitudinal direction of the motor vehicle, said pivot hinge being positioned near a rear end of said seat cushion in the longitudinal direction of the motor vehicle, said storage structure further comprising:

a floor on which said fixed rail is mounted; and a seat storage cavity defined behind said seat cushion for storing the motor vehicle seat such that a bottom of the seat cushion lies flush with said floor when the seat cushion with the seatback folded thereon is swung backward into the cavity.

6. A storage structure according to claim 1, wherein said holding means engages a rear end of said seat cushion in the longitudinal direction of the motor vehicle, said pivot hinge being positioned near a front end of said seat cushion in the longitudinal direction of a motor vehicle, the storage structure further comprising:

a floor on which said fixed rail is mounted; and a seat storage cavity defined in front of said seat cushion for storing the motor vehicle seat such that a bottom of the seat cushion lies flush with said floor when the seat cushion with the seatback folded thereon is swung forward into the cavity.

7. A storage structure according to claim 1, wherein said holding means engages a front end of said seat cushion in the longitudinal direction of the motor vehicle, said pivot hinge being positioned near a rear end of said seat cushion in the longitudinal direction of the motor vehicle, the storage structure further comprising:

a floor on which said fixed rail is mounted; and a seat storage cavity defined below a position of the seat cushion in which a passenger can be seated thereon, for storing the motor vehicle seat such that a bottom of the seat cushion lies flush with said floor when the seat cushion with the seatback folded thereon is swung backward into the cavity.

8. A storage structure according to claim 1, further comprising a side panel and a side lining on the motor vehicle, said side panel and said side lining jointly defining therebetween a housing space accommodating said fixed rail and said movable rail therein in covering relation thereto.

9. A storage structure according to claim 1, wherein said holding mechanism comprises:

a striker connected to said movable rail;

a latch angularly movably mounted on said seat cushion for disengageably engaging said striker; and a lever for selectively angularly moving said latch to disengage the striker.

10. A storage structure according to claim 1, further comprising lock means mounted on said movable rail for fixing said movable rail to said fixed rail at a given position thereon.

11. A storage structure for storing a motor vehicle seat which has a seat cushion and a seatback foldable against the seat cushion, into a seat storage cavity defined in a floor of a motor vehicle, comprising:

a bracket fixed to the seat cushion;

a housing space defined by a side lining in a passenger's compartment of the motor vehicle; and support means disposed in said housing space for supporting said bracket;

said bracket having an extension extending outwardly transversely of the motor vehicle from an end of said seat cushion, and a turn arm integral with an end of said extension and angularly movably supported by said support means such that said turn arm extends downwardly when said seat cushion is kept in a position in which a passenger can be seated thereon.

12. A storage structure according to claim 11, further comprising holding means for selectively, securely holding said seat cushion in an inoperative seating position thereof.

13. A storage structure according to claim 12, wherein said holding means comprises:

a striker disposed on the motor vehicle;

a latch angularly movably mounted on said seat cushion for disengageably engaging said striker; and a lever for selectively angularly moving said latch to disengage the striker.

14. A storage structure according to claim 11, wherein said support means includes a sleeve as a pivot hinge by which said turn arm is angularly movably supported.

15. A storage structure according to claim 11, wherein said seat storage cavity is defined behind said seat cushion and arranged such that a bottom of the seat cushion lies flush with said floor when the seat cushion with the seatback folded thereon is swung backward into the cavity.

16. A storage structure according to claim 11, wherein said support means comprises:

a fixed rail fixed to the motor vehicle;

a movable rail movable along said fixed rail; and a pivot hinge mounted on said movable rail for allowing said turn arm to move angularly thereabout.

17. A storage structure for selectively storing within a motor vehicle a seat having a seat cushion and a seatback selectively foldable against the seat cushion, the storage structure comprising:

a seat storage cavity defined in a floor of the motor vehicle;

a bracket fixed to the seat cushion;

support means for supporting said bracket in operative and storage positions of said bracket;

said bracket having a terminal extension pivotally connected to said support means for being rotated thereabout such that a bottom of said seat cushion is disposed in a spaced relationship above the floor of the motor vehicle substantially parallel thereto when the seat is disposed in said operative position thereof, and such that the bottom of the seat cushion is disposed flush with said floor when said seat is moved into said storage cavity in said storage position thereof; and holding means for selectively, securely holding said seat cushion when said seat is in said operative position thereof.

18. A storage structure according to claim 17, wherein said support means comprises a fixed rail fixed to the motor vehicle and a movable rail selectively movable along said fixed rail for adjusting a longitudinal disposition of said seat when the seat is in said operative position thereof; and said bracket is pivotally mounted to said movable rail.

19. A storage structure according to claim 18, further comprising a side panel and a side lining on the motor vehicle, said side panel and said side lining jointly defining therebetween a housing space accommodating said fixed rail and said movable rail therein in covering relation thereto.

20. A storage structure according to claim 18, wherein said storage cavity is disposed rearwardly or forwardly of said seat.

* * * * *

UNITED STATES PATENT AND TRADEMARK OFFICE
CERTIFICATE OF CORRECTION

PATENT NO. : 5,868,451
DATED : 09 February 1999
INVENTOR(S) : Koji Uno, Koji Kamida, Kunimichi Odagaki It is certified that error appears in the above-identified patent and that said Letters Patent is hereby corrected as shown below:

Column 4, line 63, change "an rear" to --a rear--.

Column 6, line numbered between 25 and 26, change "allow" to --allows--.
Column 8, line 34, change "pivots 0" to --pivots O--.
Column 9, line 51, change "hinge 0" to --hinge O--.
Column 10, line 11, change "an rear" to --a rear--;
      line numbered between 44 and 45, change "hinges 0" to --hinges O--.

Signed and Sealed this

Third Day of August, 1999

Attest:

Q. TODD DICKINSON

*Attesting Officer*     *Acting Commissioner of Patents and Trademarks*